(12) United States Patent
Tominaga

(10) Patent No.: US 7,148,980 B2
(45) Date of Patent: Dec. 12, 2006

(54) METHOD AND APPARATUS FOR A NETWORKED IMAGING SYSTEM

(75) Inventor: Masahiko Tominaga, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 829 days.

(21) Appl. No.: 09/855,586

(22) Filed: May 16, 2001

(65) Prior Publication Data

US 2002/0015180 A1  Feb. 7, 2002

(30) Foreign Application Priority Data

May 30, 2000  (JP)  ............................. 2000-160311
May 8, 2001  (JP)  ............................. 2001-137313

(51) Int. Cl.
*G06Q 99/00* (2006.01)

(52) U.S. Cl. ........................ 358/1.15; 358/1.14; 705/59

(58) Field of Classification Search ............... 358/1.15, 358/1.16, 1.14; 707/104, 100; 705/59
See application file for complete search history.

(56) References Cited

U.S. PATENT DOCUMENTS 5,845,065 A * 12/1998 Conte et al. ................. 713/200

6,809,831 B1 * 10/2004 Minari ....................... 358/1.15

* cited by examiner

*Primary Examiner*—Kimberly Williams
*Assistant Examiner*—Peter K. Huntsinger
(74) *Attorney, Agent, or Firm*—Fitzpatrick, Cella, Harper & Scinto

(57) ABSTRACT

An image forming system includes a server and client computers connected to a network, one or a plurality of image forming devices connected to either the network or the server, and devices of which one or a plurality can be connected to the server and which can be recognized by the server. The system holds the number of image forming devices set as output destinations, recognizes the presence of connected devices and the number thereof connected, and compares the number N of devices connected to the server that have been recognized and the number M of image forming devices already set as output destinations at the time of setting the image forming devices as output destinations. Thus, unauthorized use of image processing software operating on image forming devices for generating image data to be supplied to image forming devices, can be prevented.

23 Claims, 32 Drawing Sheets

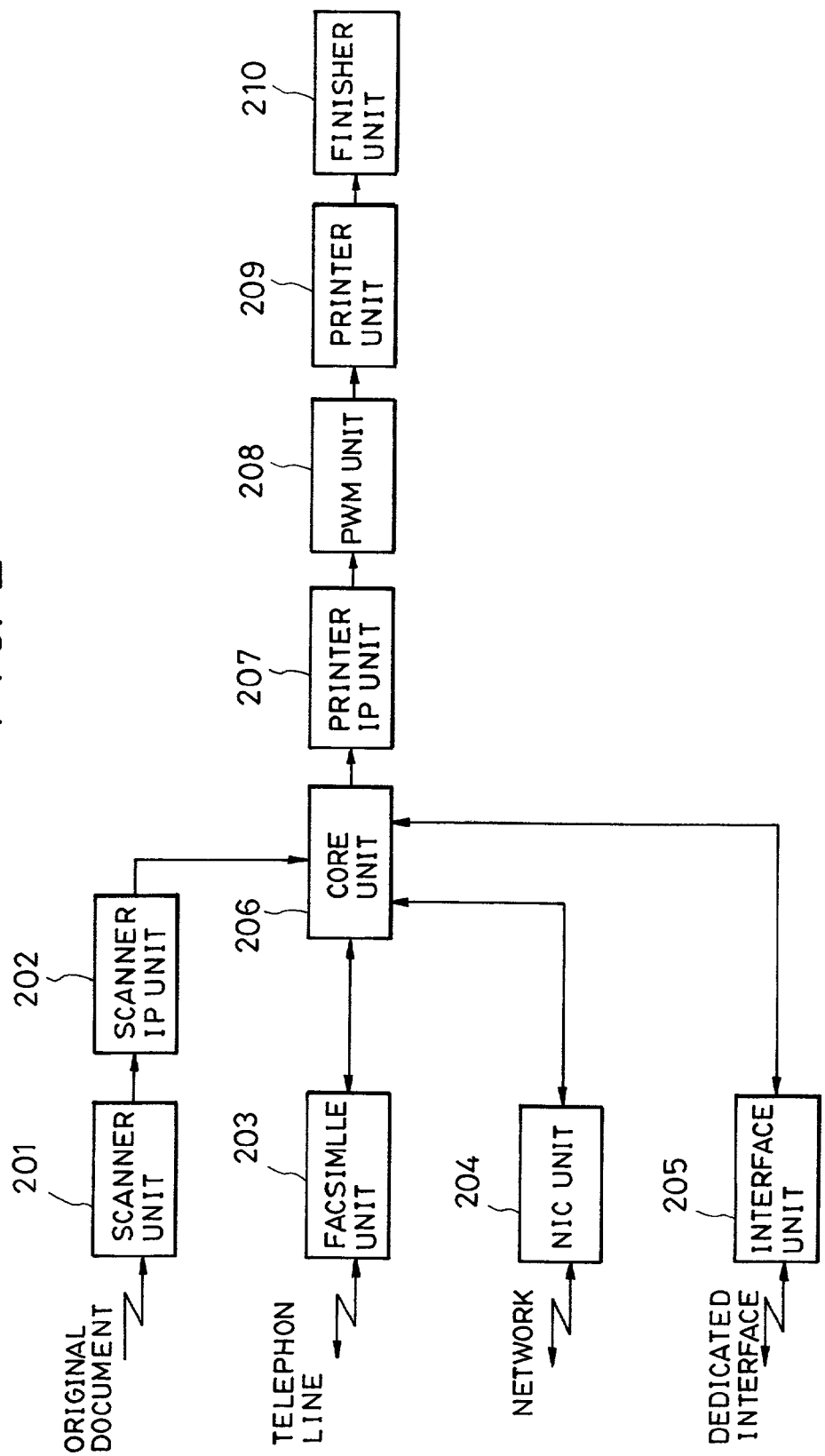

CASE OF COLOR SCANNER:

CASE OF MONOCHROME SCAN:

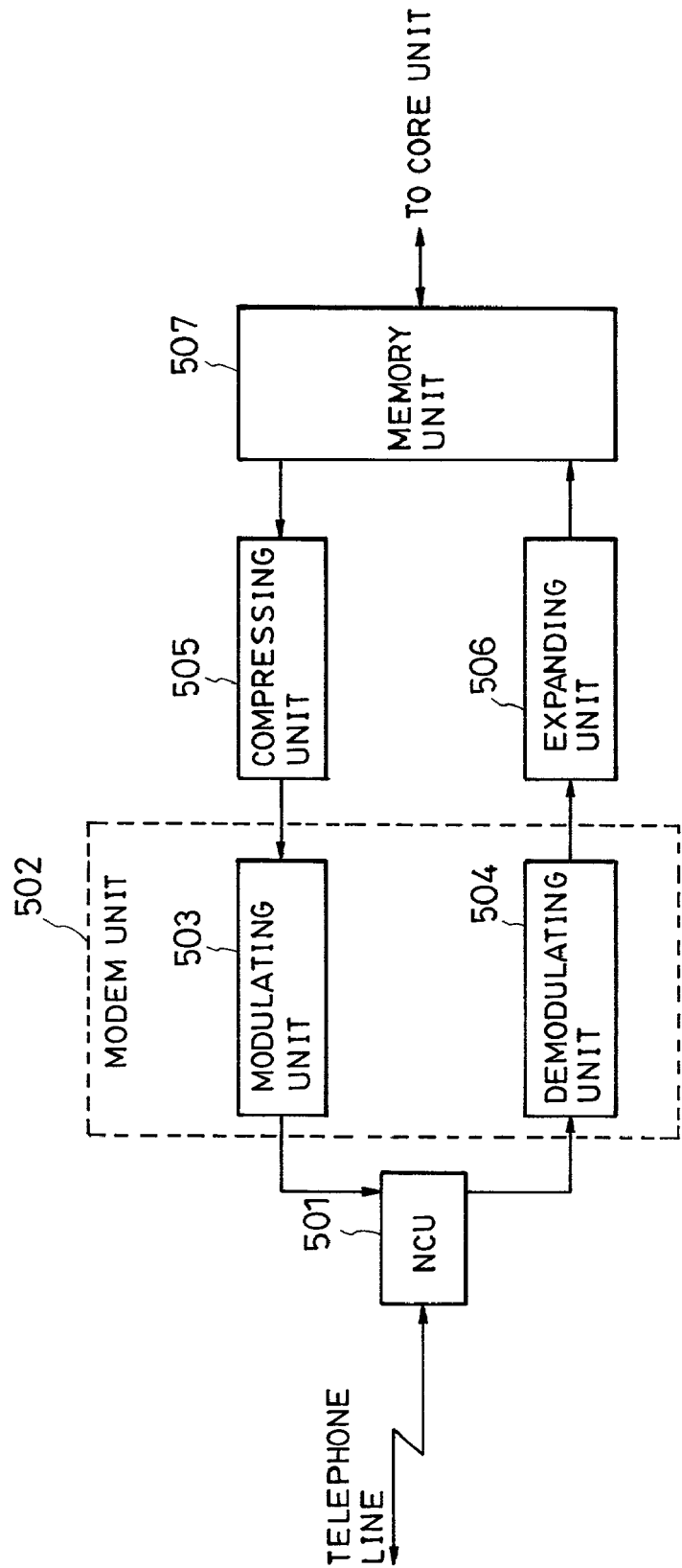

CASE OF COLOR PRINTER

CASE OF MONOCHROME PRINTER

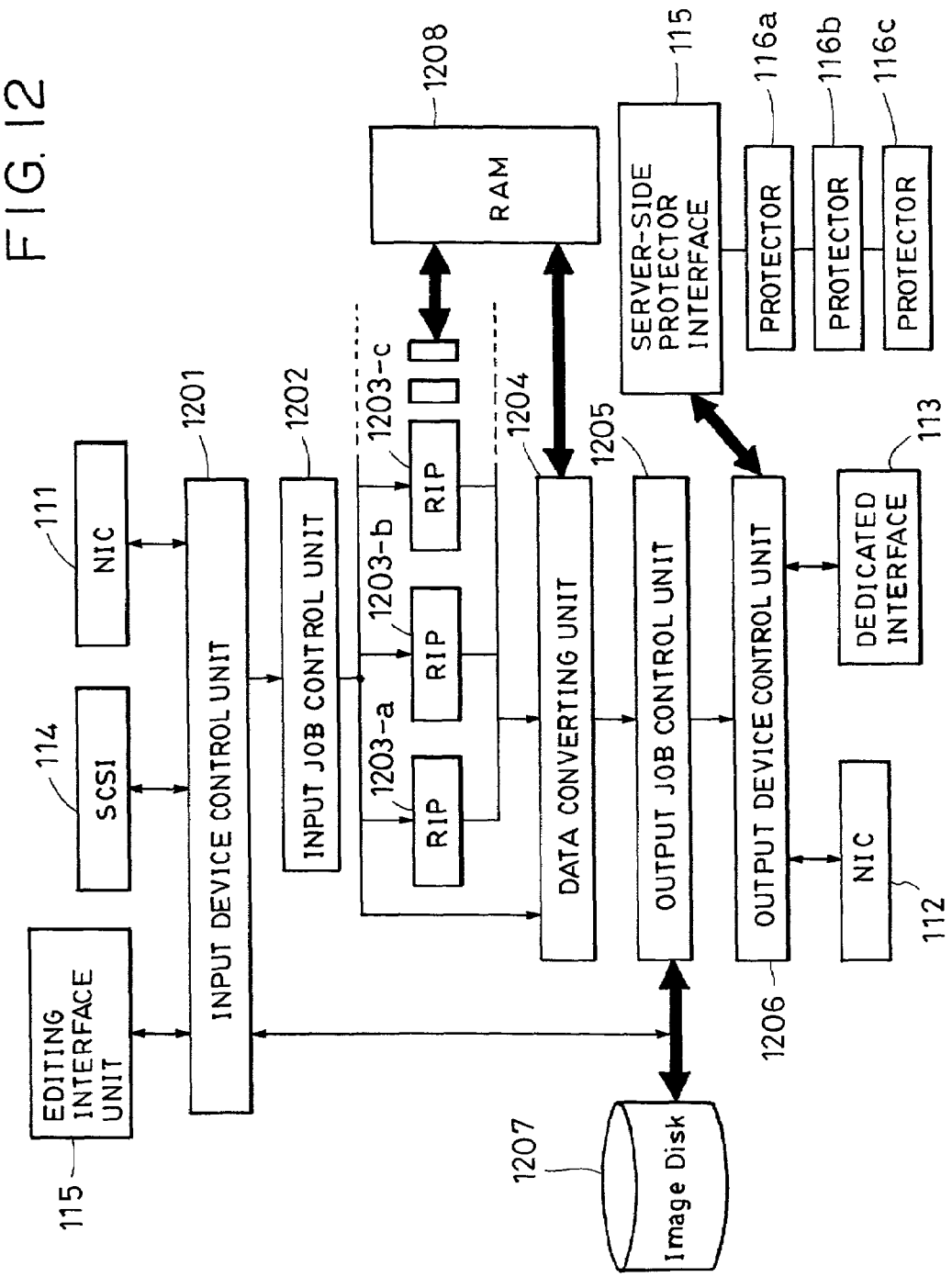

```
[R1301]
char_color={0.0,0.0,0.0,1.0} ;           ←L1311
string1="IC" ;                            ←L1312
put_line (0.0,0.0,0.3,0.1,string) ;       ←L1313

[R1302]
line_color={1.0,0.0,0.0,0.0} ;            ←L1321
put_line (0.9,0.0,0.9,1.0,0.1) ;          ←L1322

[R1303]
image1={CMYK,8,5,5,C0,M0,Y0,K0,           ←L1331
                C1,M1,Y1,K1,
                    ......
                C24,M24,Y24,K24} ;
put_image (0.0,0.5,0.5,0.5,image1) ;      ←L1332
```

FIG. 23

2301 — Job Status

Job Status

2302

| | Job Name | Status | Priority | Pages | Copies | Paper |
|---|---|---|---|---|---|---|
| 1 | File-6 | Ripping | High | 200 | 20 | Letter |
| 2 | File-7 | Ripping | Low | 120 | 30 | 11 × 17 |
| 3 | File-8 | Waiting | Medium | 300 | 15 | Letter |
| 4 | File-9 | Waiting | Medium | 20 | 350 | Letter |
| 5 | File-10 | Waiting | Medium | 155 | 10 | 11 × 17 |

Printing Status

2303

| | Job Name | Status | Printer | Pages | Copies | Paper |
|---|---|---|---|---|---|---|
| 1 | File-1 | Printing | Copy Cluster-bcd | 120 | 130 | Letter |
| 2 | File-2 | Printing | Printer 3 | 80 | 240 | Letter |
| 3 | File-3 | Waiting | Printer 1 | 230 | 15 | Letter |
| 4 | File-4 | Waiting | Printer 2 | 40 | 25 | 11 × 17 |
| 5 | File-5 | Waiting | Printer 3 | 35 | 10 | 11 × 17 |

History of finished job

2304

| | Job Name | Status | Job ID | Pages | Copies | Paper |
|---|---|---|---|---|---|---|
| 1 | File-F | Printed | #00122 | 110 | 30 | Letter |
| 2 | File-D | Canceled | #00121 | 25 | 20 | 11 × 17 |
| 3 | File-C | Printed | #00120 | 35 | 150 | Letter |
| 4 | File-B | Printed | #00119 | 110 | 40 | Letter |
| 5 | File-A | Canceled | #00118 | 240 | 35 | 11 × 17 |

FIG. 26

| Printer Type | Printer Name | IP address | Finishing option | License |
|---|---|---|---|---|
| MFP104 | MFP104 | None | Finisher-A | None |
| MFP105 | MFP105a | 192.168.0.2 | None | Yes |
| MFP105 | MFP105b | 192.168.0.3 | Installed | Yes |
| MFP105 | MFP105c | 192.168.0.4 | Installed | Yes |

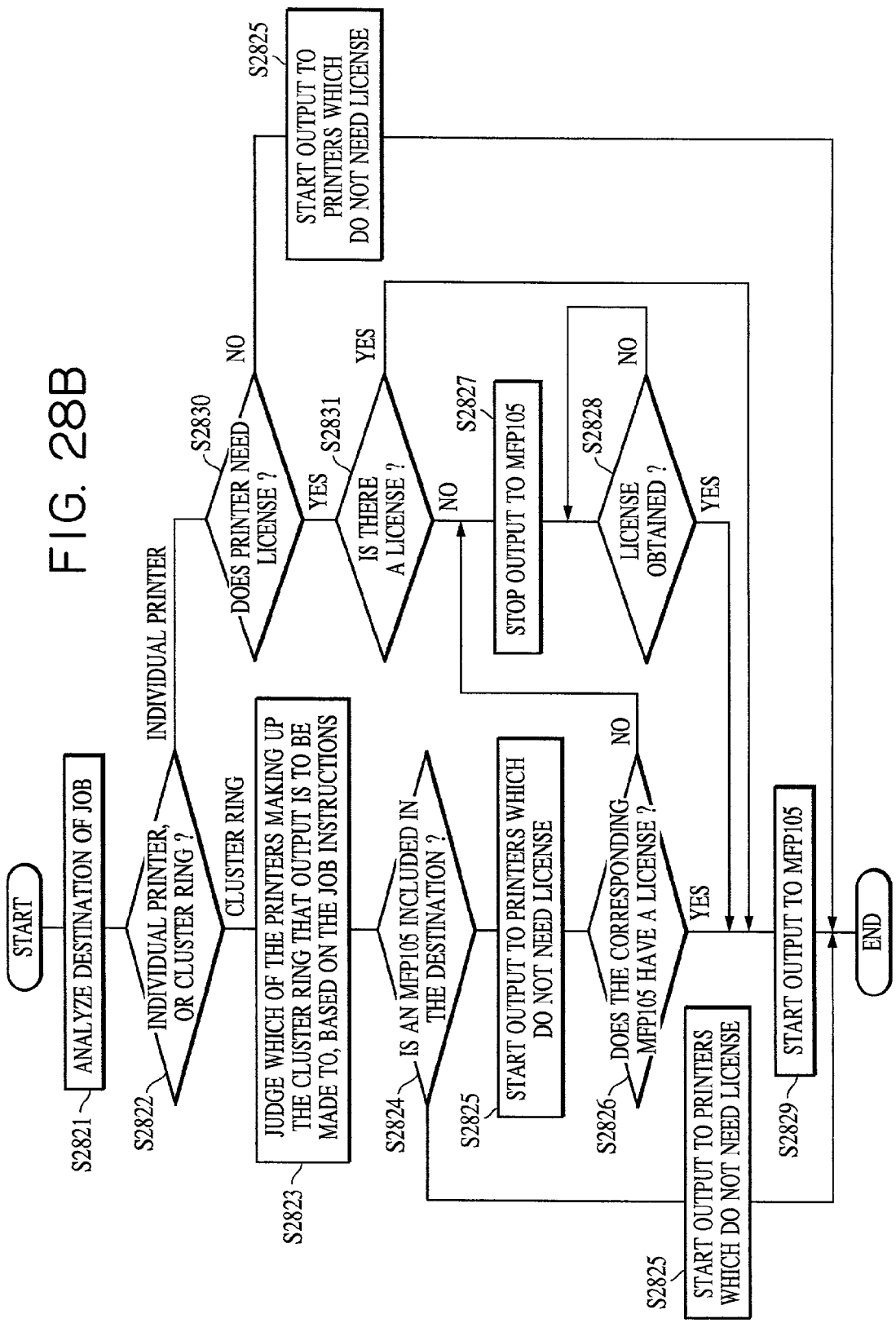

FIG. 29

| Printer Type | Printer Name | IP address | Finishing option | License |
|---|---|---|---|---|
| MFP104 | MFP104 | None | Finisher-A | None |
| MFP105 | MFP105a | 192.168.0.2 | None | Yes |
| MFP105 | MFP105b | 192.168.0.3 | Installed | Yes |
| MFP105 | MFP105c | 192.168.0.4 | Installed | Yes |
| MFP105 | MFP105d | 192.168.0.5 | Installed | Error |

Job Status

Job Status

|   | Job Name | Status | Priority | Pages | Copies | Paper |
|---|---|---|---|---|---|---|
| 1 | File-6 | Ripping | High | 200 | 20 | Letter |
| 2 | File-7 | Ripping | Low | 120 | 30 | 11 × 17 |
| 3 | File-8 | Waiting | Medium | 300 | 15 | Letter |
| 4 | File-9 | Waiting | Medium | 20 | 350 | Letter |
| 5 | File-10 | Waiting | Medium | 155 | 10 | 11 × 17 |

Printing Status  3101

|   | Job Name | Status | Printer | Pages | Copies | Paper |
|---|---|---|---|---|---|---|
| 1 | File-1 | License Error | Copy Cluster-bcd | 120 | 130 | Letter |
| 2 | File-2 | Printing | Printer 3 | 80 | 240 | Letter |
| 3 | File-3 | Waiting | Printer 1 | 230 | 15 | Letter |
| 4 | File-4 | Waiting | Printer 2 | 40 | 25 | 11 × 17 |
| 5 | File-5 | Waiting | Printer 3 | 35 | 10 | 11 × 17 |

History of finished job

|   | Job Name | Status | Job ID | Pages | Copies | Paper |
|---|---|---|---|---|---|---|
| 1 | File-E | Printed | #00122 | 110 | 30 | Letter |
| 2 | File-D | Canceled | #00121 | 25 | 20 | 11 × 17 |
| 3 | File-C | Printed | #00120 | 35 | 150 | Letter |
| 4 | File-B | Printed | #00119 | 110 | 40 | Letter |
| 5 | File-A | Canceled | #00118 | 240 | 35 | 11 × 17 |

US 7,148,980 B2

METHOD AND APPARATUS FOR A NETWORKED IMAGING SYSTEM

BACKGROUND OF THE INVENTION

1. Field of the Invention

The present invention relates to an image forming system comprising, for example, a document server, clients, and image forming devices, and to devices used with the image forming system.

2. Description of the Related Art

Conventionally, users have performed image forming by selecting a desired printer from a computer and causing the selected printer to print a certain job via an general-purpose interface such as a LAN or an interface using dedicated hardware.

Also, a system called server-client, wherein jobs of client users are sent to printers via a document server, is also widely known.

Further, in recent years, cases wherein image forming devices print great numbers of jobs from a computer in a light-printing market called print-on-demand are increasing, so means for printing great numbers of jobs as efficiently as possible are in demand.

To this end, a server capable of handling great numbers of jobs and multiple image forming devices connected thereto are necessary, since having one job printed by one image forming device is inefficient. Also, when performing great numbers of prints, there is the need to manage and efficiently operate the state of multiple image forming devices, thus necessitating a high-performance controller. Accordingly, systems are being built wherein high-performance computers are used as servers, with the computer also having controller functions.

However, server functions and controller functions provided by computers are often of software configurations. Also, when the computer and image forming devices are connected by a general-purpose interface, copying software to other computers allows server functions and controller functions to be provided to the computer without authorization, which can then print with the image forming devices.

SUMMARY OF THE INVENTION

Accordingly, it is an object of the present invention to effectively prevent illegitimate use of software having server functions and controller functions.

To solve the above-described problems, an image forming system according to the present invention is an image forming system that includes a server and client computers connected to a network, one or a plurality of image forming devices connected to either the network or the server, and devices of which one or a plurality can be connected to the server and which can be recognized by the server. The system comprises: means for inputting to the server jobs to be printed by an image forming device; means for rendering jobs input by the input means into images; means for outputting images rendered by the rendering means to an image forming device specified by the job; means for setting the image forming device as the output destination at the server; output destination information holding means for holding a number of image forming devices set as the output destination by the setting means; means for recognizing the presence of connected devices, and the number N thereof connected; and means for comparing the number N of the devices connected to the server that have been recognized by the recognizing means, and a number M of image forming devices already set as output destinations by the holding means, at the time of setting the image forming devices as an output destination with the setting means.

Also, a device according to the present invention is a device which can be recognized by a server connected to a network, for controlling use of software by devices connected to the network. The device comprises: communicating means for communicating data with the server; and storing means for storing data used by the server to permit use of the software.

Further objects, features and advantages of the present invention will become apparent from the following description of the preferred embodiments with reference to the attached drawings.

BRIEF DESCRIPTION OF THE DRAWINGS

FIG. 2 is an overall block diagram of an image forming device;

FIG. 5 is a block diagram of the facsimile unit of an image forming device;

FIG. 12 is a job flowchart within the document server according to the present invention;

FIG. 23 is a diagram illustrating an example screen for job status;

FIG. 26 is a diagram illustrating an example of an output device managing table;

FIGS. 28A and 28B are flowcharts for the output device control unit according to a second embodiment at the time of executing jobs;

FIG. 29 is a diagram illustrating an example of and output device management table according to the second embodiment;

FIG. 31 is a diagram illustrating an example screen for the job status according to the second embodiment.

DESCRIPTION OF THE PREFERRED EMBODIMENTS (First Embodiment)

<Description of the Overall System>

Figure 1A:
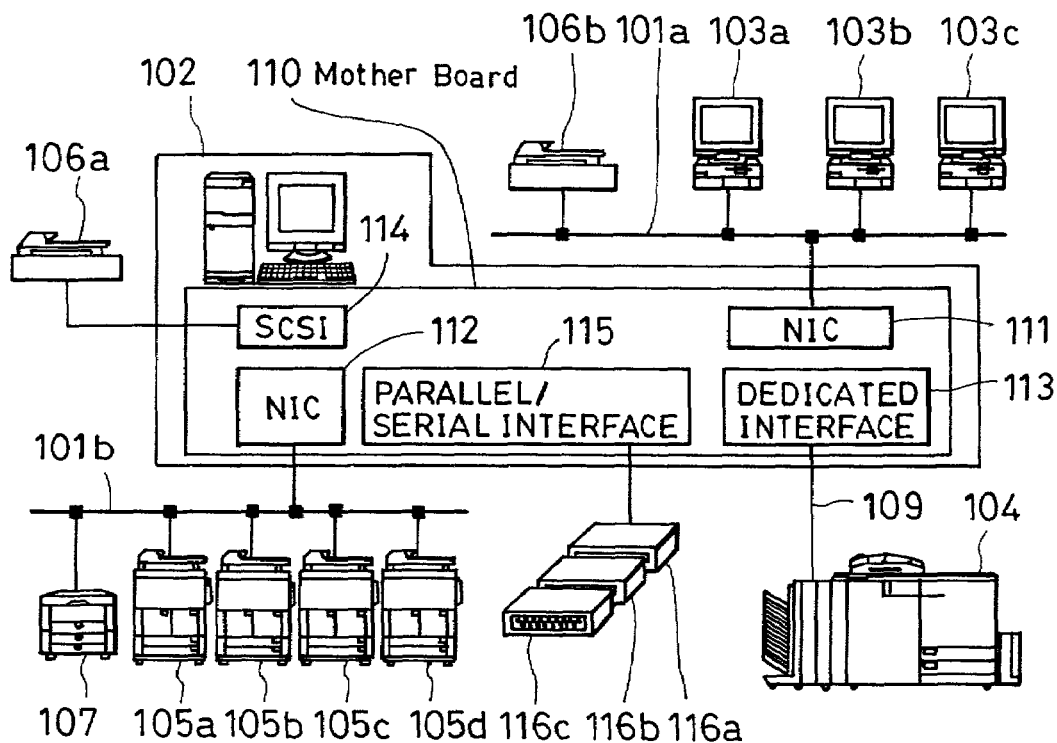
FIGS. 1A and 1B are diagrams illustrating the overall system of the present invention and a conventional example, respectively.
Figure 1B:
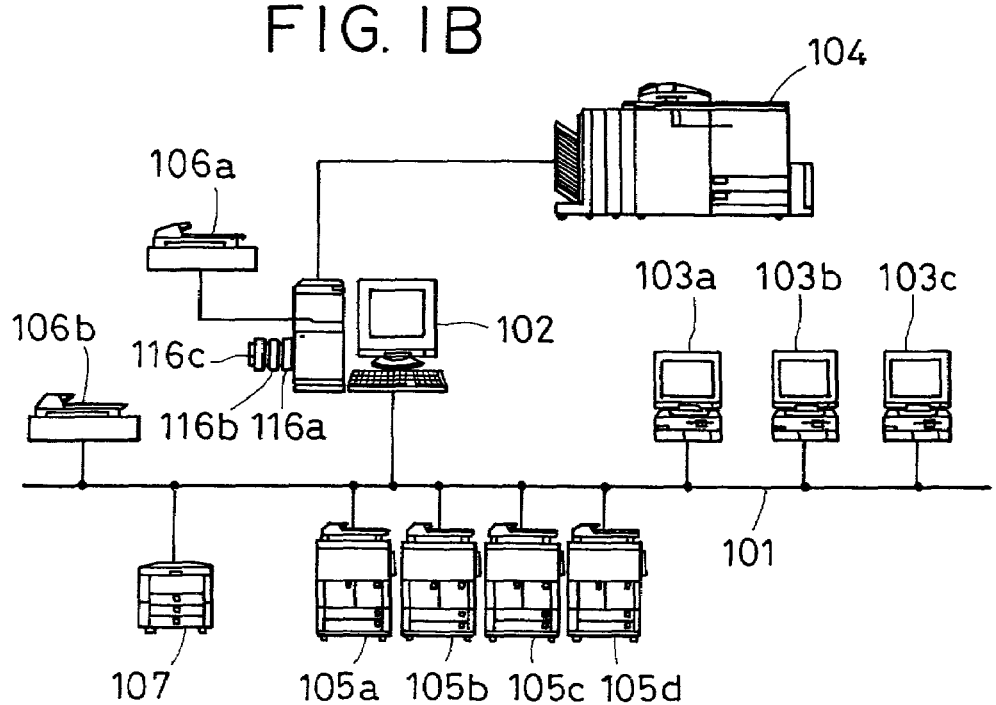

FIG. 1A is a schematic view of the system according to an embodiment of the present invention, compared with a conventional comparative example shown in FIG. 1B.

In order to give performance priority, the system shown in FIG. 1A divides the network 101 shown in FIG. 1B into two systems, which will be referred to as a public network 101a and a private network 101b.

A document server 102 has network interface cards (NICs) for the hardware of the two systems, one being a NIC 111 connected to the public network 101a and the other being a NIC 112 connected to the private network 101b to be connected to the printer side.

Computers 103a, 103b, and 103c are clients for sending jobs to the document server. Though not shown, a great many more clients are connected. Hereafter, the clients will be representatively be denoted by reference numeral 103.

Further connected to the private network 101b are MFPs (Multi-Function Peripherals) 105a–105d and a printer 107. The MFPs 105a–105d are MFPs that perform monochrome scanning, printing, or low-resolution or binary simple color scanning, color printing, and so forth. Also, though not shown in the drawing, many more MFPs other than the above are connected to the private network 101b, along with scanners, printers, facsimile devices, and so forth.

The MFP 104 is a full-color MFP, which is capable of performing high-resolution, high gradient full-color scanning, printing, etc., and may be connected to the private network 101b to exchange data. However, because the amount of data can be great, in this arrangement the MFP 104 is provided with an independent interface to allow simultaneous exchange of multiple bits, and so as to be connected to the document server 102 by its own interface card 113.

Also, the scanners 106a–106b are devices for taking in images from sheet documents. There are two types of the scanners, a type 106b, which is connected by a SCSI interface, and a type 106a, which is connected to the public network 101a (or to the private network 101b).

The hardware configuration of the document server 102 is such that an interface called a PCI bus is connected to a part called a motherboard, which has CPUs, memory, and so forth, and which is connected to the above-described NICs 111 and 112, a dedicated interface card 113, a SCSI card 114, and so forth.

Further, the document server 102 is provided with a server-side protector interface 115, to which an arbitrary number of protectors 116a–116c which are devices to which the document server 102 is capable of connection and recognizing the number thereof.

The server-side protector interface 115 is configured of a general-purpose serial/parallel interface and driver programs for exchanging information with the protectors via the general-purpose interface.

Application software, which realizes so-called DTP (DeskTop Publishing), is operated on the client computer 103, such that various types of documents and graphics are created and/or edited. The documents and graphics created with the client computer 103 are converted into a PDL (Page Description Language), and printed by being sent to MFPs 104 or 105 via the network 101a.

The MFPs 104 and 105 each have communicating means capable of exchanging information with the document server 102 and the network 101b or with a dedicated interface 109, and information regarding the state of the MFPs 104 and 105 is continuously notified to the document server 102 or to the client computer 103 side via the document server 102. Further, the document server 102 (or the client 103) has utility software, which operates upon receiving such information, so that the MFPs 104 and 105 are managed by the document server 102 (or the client 103).

<Configuration of MFPs 104 and 105>

Next, the configuration of the MFPs 104 and 105 will be described with reference to FIGS. 2 through 11. Note, however, that the difference between MFPs 104 and 105 is monochrome or full-color, and often the full-color device encompasses the configuration of the B/W device except for the matter of color, so description will be made here with reference to the full-color device, and description of the B/W device will be added as necessary on occasion.

The MFPs 104 and 105 include a scanner unit 201 for reading in image information and a scanner IP unit 202 for subjecting the image data to image processing, a facsimile unit 203 such as a facsimile device for exchanging the images using telephone lines, and further include a NIC (Network Interface Card) unit 204 for exchanging image data and information using the network, and a dedicated interface unit 205 which performs information exchange with the full-color MFP 104. Depending on how the MFPs 104 and 105 are used, the core unit 206 temporarily saves the image signals or determines the path thereof.

Next, image data output from the core unit 206 is sent to a printer IP unit 207 and a printer unit 209, which performs image forming via the PWM unit 208. The sheets printed out at the printer unit 209 are sent to the finisher unit 210, where sheets are sorted and finished.

<Configuration of the Scanner Unit 201>

Figure 3:
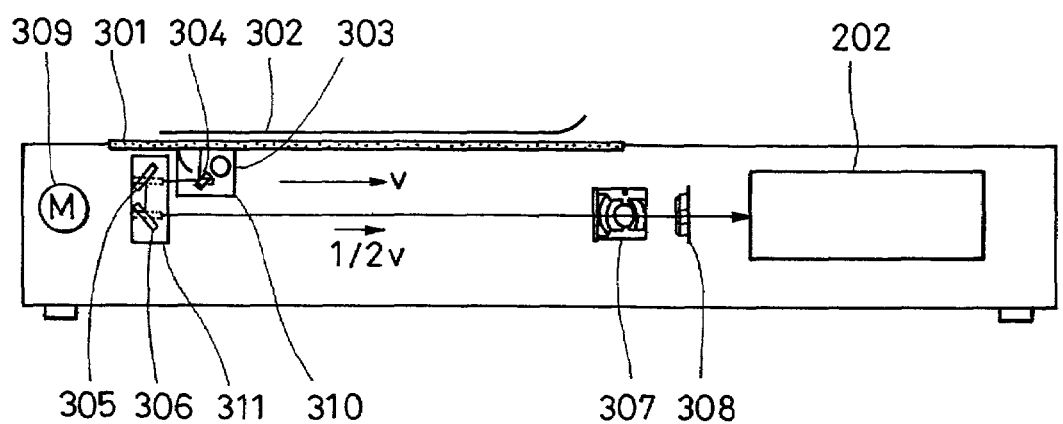
FIG. 3 is a diagram illustrating the scanner unit of an image forming device.

The configuration of the scanner unit 201 will be described with reference to FIG. 3. Reference numeral 301 denotes an original document table glass, upon which original documents 302 to be read are placed. An original document 302 is irradiated by light from an illuminating lamp 303, and the reflected light therefrom is imaged on a CCD 308 by a lens 307, via mirrors 304, 305, and 306. A first mirror unit 310 containing the mirror 304 and illuminating lamp 303 moves at a speed v, and a second mirror unit 311 containing the mirrors 305 and 306 moves at a speed ½ v, thereby scanning the entire face of the original document 302. The first mirror unit 310 and the second mirror unit 311 are driven by a motor 309.

<Configuration of the Scanner IP Unit 202>

Figure 4A:
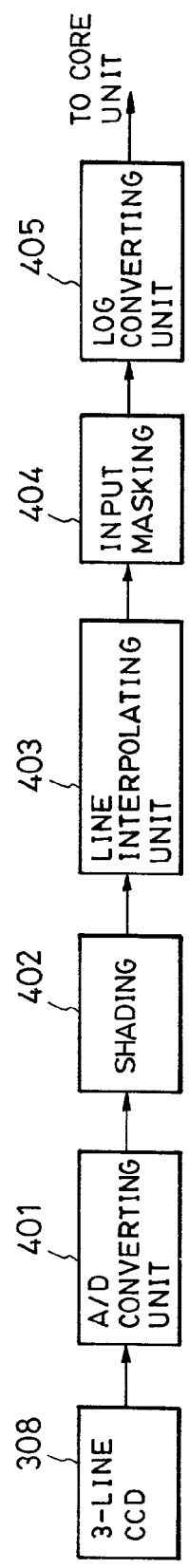
FIGS. 4A and 4B are block diagrams of the scanner IP unit of an image forming device.

The scanner IP unit 202 will be described with reference to FIG. 4A. Input optical signals are converted into electric signals by the CCD sensor 308.

The CCD sensor 308 is a line color sensor of RGB3, and the signals are input to an A/D converter 401 as image signals of R, G, and B. Here, following adjustment of gain and adjustment of offset, each of the color signals are converted into 8-bit digital image signals RO, GO, and BO, with the A/D converter. Subsequently, known shading correction using signals read from a reference white plate is performed for each of the colors, at the shading correction unit 402. Further, the liner sensors for each color of the CCD sensor 308 are positioned with predetermined mutual spacing therebetween, so the spatial offset in the sub-scanning direction is corrected with the line delay adjusting circuit (line interpolating unit) 403.

Next, the input masking unit 404 is a unit which converts read color space determined by spectral properties of the R, G, and B filters of the CCD sensor 308 into standard NTSC color space, wherein 3×3 matrix computation using constants unique to the device taking into consideration the sensitivity properties/illumination lamp spectral properties and other such properties of the CCD sensor is performed, and the input (RO, GO, and BO) signals are converted into standard (R, G, B) signals.

Further, a brightness/concentration converting unit (LOG converting unit) 405 is configured of lookup table (LUT) RAM, and the RGB brightness signals are converted so as to become C1, M1, and Y1 concentration signals.

Figure 4B:
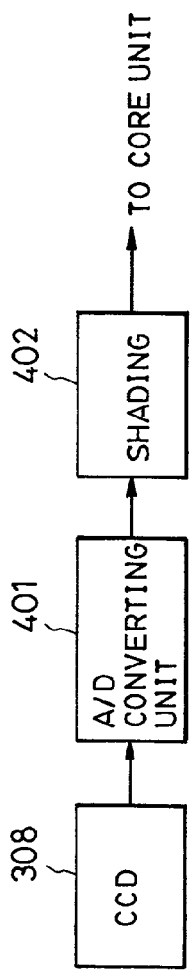

In the event of performing monochrome image processing with the MFP 105, a monochromatic 1-line CCD sensor 308 is used according to FIG. 4B, using an A/D conversion unit 401 and a shading unit 402 in monochrome, and then sending the signals to the core unit 206.

<Configuration of the Facsimile Unit 203>

Description will be made regarding the facsimile unit 203 with reference to FIG. 5. First, at the time of receiving, data coming from the telephone line is received with a NCU unit 501 and subjected to voltage conversion, A/D conversion and demodulation at a demodulating unit 504 within a modem unit 502, and then rendered into raster data at an expanding unit 506. Generally, run-length or the like is used for compression and expansion for facsimiles. The image converted into raster data is temporarily stored in a memory unit 507, and then, once confirmation is made that there are no transfer errors in the image data, the image is sent to the core unit 206.

Next, at the time of transmitting, compression such as run-length is performed on the raster image signals from the core unit with a compressing unit 505, and, following performing D/A conversion and modulation with a modulating unit 503 within the modem 502, the data is sent to the telephone line via the NCU unit 501.

<Configuration of the NIC Unit 204>

Figure 6A:
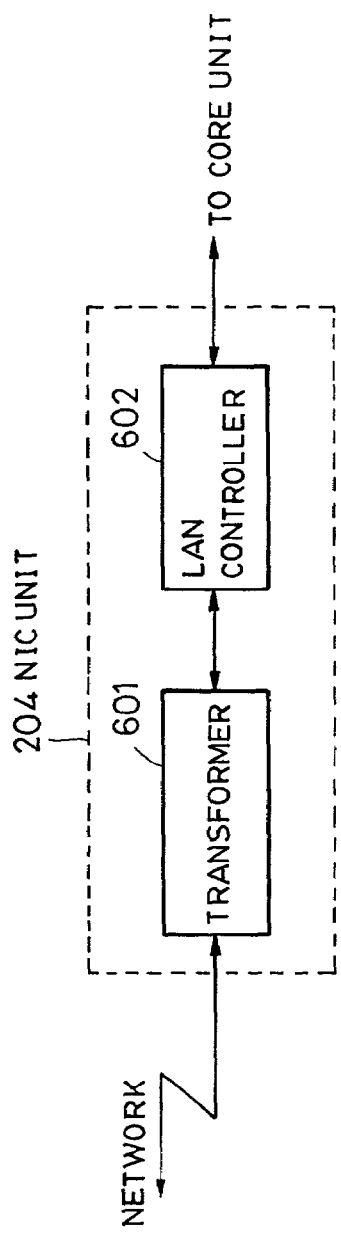
FIGS. 6A and 6B are block diagrams of the NIC unit and core unit of an image forming device.

Next, the NIC unit 204 will be described with reference to FIG. 6A. It is this NIC unit 204 which has the interface functions with the network 101, and serves to obtain external information using Ethernet cables or the like of 10Base-T/ 100Base-TX, for example, and sending information out externally.

In the event of obtaining external information, first, voltage conversion is made at the transformer 601, and the information is sent to the LAN controller unit 602. The LAN controller unit 602 has a first buffer memory (not shown) therein, and upon making judgment whether or not the information is necessary information, the information is sent to a second buffer memory (not shown), and then signals are sent to the core unit 206.

Next, in the event of providing information externally, the data sent to the core unit 206 is subjected to adding of necessary information at the LAN controller unit 602, and connection is made to the network 101 via the transformer unit 601.

<Configuration of Dedicated Interface Unit 205>

The dedicated interface unit 205 is an interface wherein multi-value bits of C, M, Y, and K are each sent in parallel at an interface portion with the full-color MFP 104, the image data being of 4 colors by 8 bits, via communication lines. In the event that transmission is made by Ethernet, output cannot be made at speeds appropriate for the MFP 104, and the performance of other devices connected to the network will also suffer. Therefore, such a dedicated parallel interface is used.

<Configuration of the Core Unit 206>

Figure 6B:
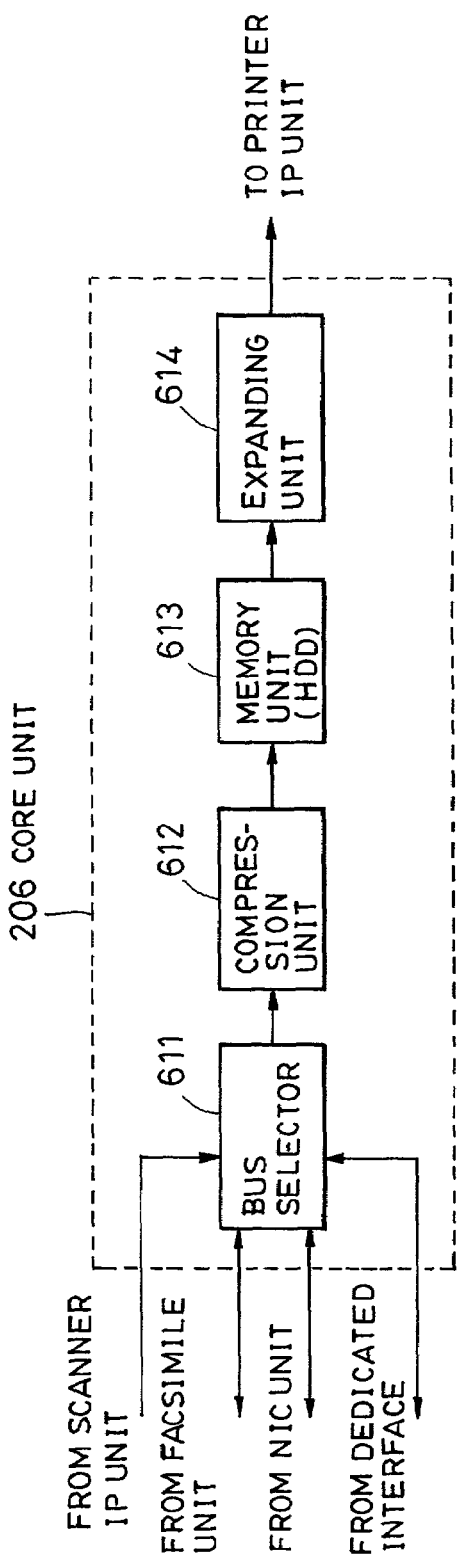

The core unit 206 will be described with reference to FIG. 6B. A bus selector unit 611 of the core unit 206 serves as a traffic director for using the MFPs 104 and 105. That is to say, this is the place where the bus is switched according to the functions of the MFPs 104 and 105, such as photocopy functions, network scanning, network printer, facsimile transmission/reception, displaying, etc.

The following illustrates path switching patterns for executing the functions.

Photocopy functions: scanner 201; core 206; printer 209
Network scanning: scanner 201; core 206; NIC unit 204
Network printing: NIC unit 204, core 206; printer 209
Facsimile transmission functions: scanner 201; core 206; facsimile unit 203
Facsimile reception functions: facsimile unit 203; core 206; printer 209

Next, the image data from the bus selector unit 611 is sent to the printer unit 209 via the compression unit 612, a memory unit 613 made up of large-capacity memory such as a hard disk (HDD), and the expanding unit 614. Generally-used compression formats such as JPEG, JBIG, ZIP, etc., can be used for the compression method carried out at the compression unit 612. The compressed image data is managed by individual job, and is stored along with added data such as file name, creator, date of creation, file size, and so forth.

Further, providing a job number and a password, and sorting the data with these allows personal box functions to be supported as well. This is a function for temporarily saving data and allowing printing out (reading out from the HDD) by only particular individuals. In the event that printing out of a job stored therein is instructed, verification is made by password following which the job is retrieved from the memory unit 613, image expanding is performed to return it to a raster image, and then sent to the printer unit 207.

<Configuration of the Printer IP Unit 207>

Figure 7A:
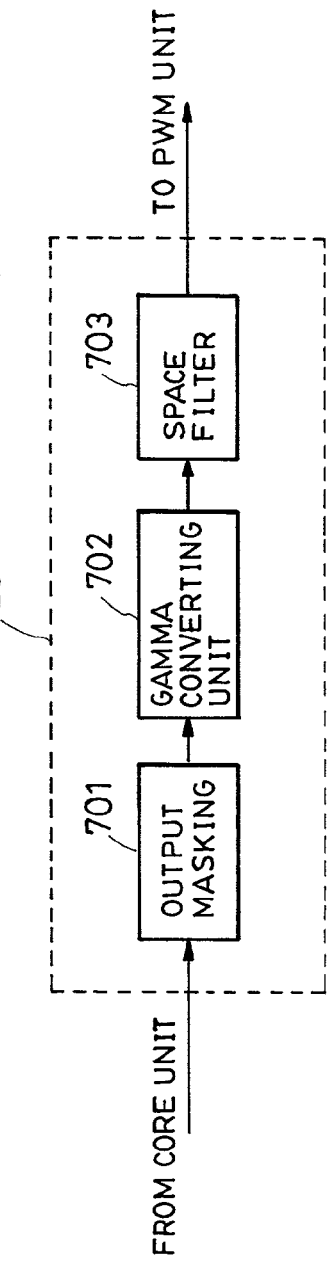
FIGS. 7A and 7B are diagrams illustrating the printer IP unit of an image forming device.
Figure 7B:
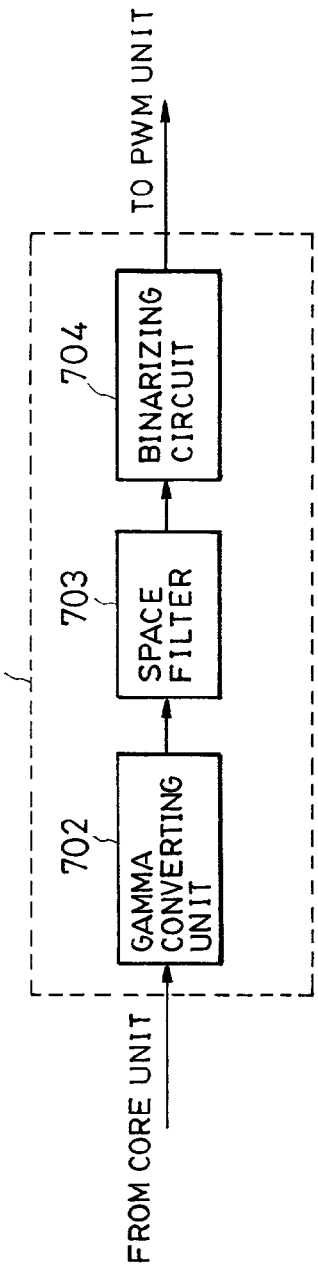

In FIGS. 7A and 7B, reference numeral 701 denotes an output masking/UCR circuit unit, where M1, C1, and Y1 signals are converted by matrix computation into Y, M, C, and K signals which are the toner colors of the image forming device, and the C1, M1, Y1, and K1 signals based on the RGB signals read in with the CCD sensor 308 are converted into C, M, Y, and K signals based on the spectral distribution properties of the toner, and then output.

Next, at a gamma converting unit 702, data is converted into C, Y, M, and K data for image output using a lookup table (LUT) RAM taking the color properties of the toner into consideration, and following sharpness or smoothing processing at the spatial filter 703, the image signals are sent to the core unit 206.

<Configuration of the PWM Unit 208>

Figure 8A:
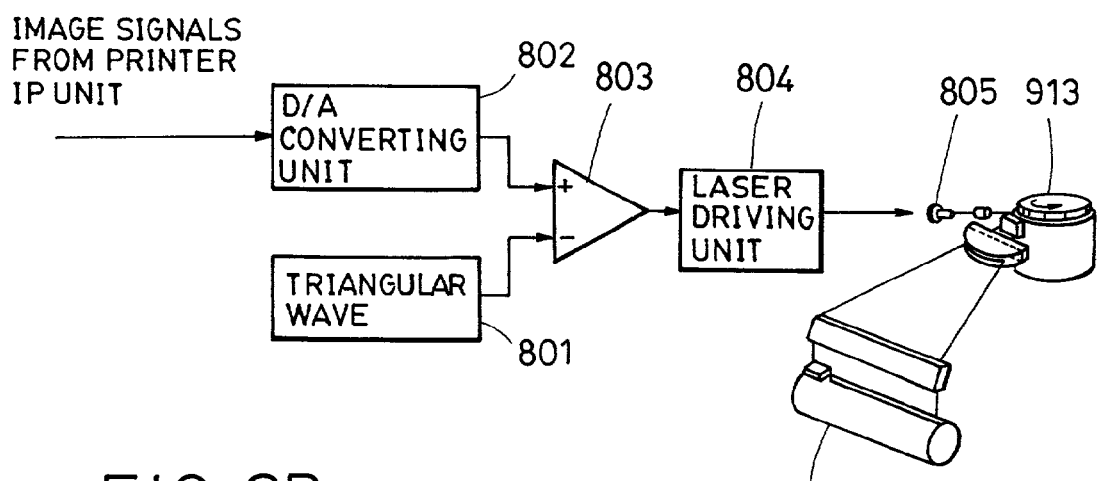
FIGS. 8A and 8B are block diagrams of the PWM unit of an image forming device.
Figure 8B:
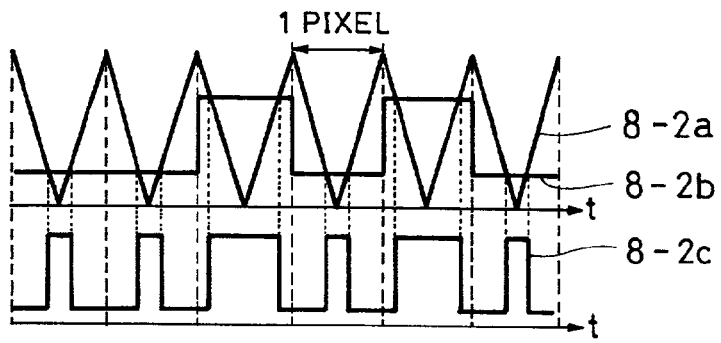

The PWM unit 208 will be described with reference to FIG. 8. The image data from the printer IP unit 207 divided into the four colors of yellow (Y), magenta (M), cyan (C), and black (K) (monochrome in the case of the MFP 105) passes through the PWM unit 208, forming images for each. Reference numeral 801 denotes a triangular wave generating unit, and 802 denotes a D/A converter (D/A converting unit) for converting the input digital image signals into analog signals. Signals from the triangular wave generating unit 801 (8-2a) and signals from the D/A converter 802 (8-2b) are compared by the comparator 803 regarding the magnitude thereof, and are turned into signals such as (8-2c) and sent to the laser driving unit 804, where each of the CMYK colors are converted into laser beams of lasers 805 for each of CMYK.

Then, the respective laser beams are scanned at a polygon scanner 913, and irradiated on photosensitive drums 917, 921, 925, and 929.

<Configuration of Printer Unit 209 (Case of Color MFP 104)>

Figure 9:
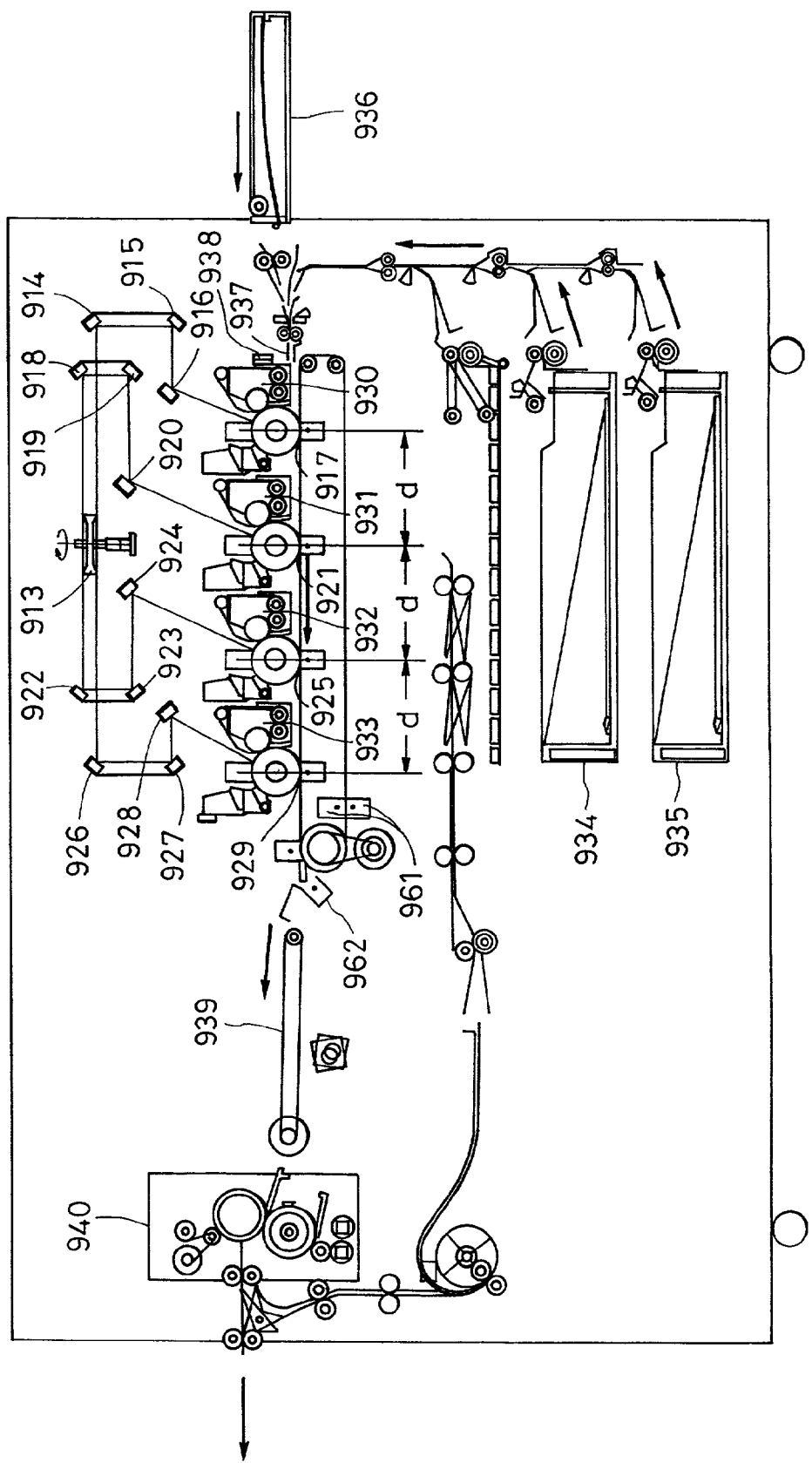
FIG. 9 is a diagram illustrating the printer unit of a color image forming device.

FIG. 9 shows a schematic view of the color printer unit. Reference numeral 913 denotes a polygon mirror, which receives four laser beams irradiated from four semiconductor lasers 805. One of these scans the photosensitive drum 917 via the mirrors 914, 915, and 916, another of these scans the photosensitive drum 921 via the mirrors 918, 919, and 920, another of these scans the photosensitive drum 925 via the mirrors 922, 923, and 924, and another of these scans the photosensitive drum 929 via the mirrors 926, 927, and 928.

On the other hand, reference numeral 930 denotes a developer that supplies yellow (Y) toner, which forms a yellow toner image on the photosensitive drum 917 according to the laser beam, reference numeral 931 denotes a developer that supplies magenta (M) toner, which forms a magenta toner image on the photosensitive drum 921 according to the laser beam, reference numeral 932 denotes a developer that supplies cyan (C) toner, which forms a cyan toner image on the photosensitive drum 925 according to the laser beam, and reference numeral 933 denotes a developer that supplies black (K) toner, which forms a black toner image on the photosensitive drum 929 according to the laser beam. These four colors (Y, M, C, and K) toner images are transferred onto a sheet, thus obtaining a full-color output image.

Sheets fed from a sheet cassette 934 or 935 or a hand-feed tray 936 pass over a resister roller 937 and are adhered to a transfer belt 938, and thus transported. The toner images of each of the colors are formed on the photosensitive drums 917, 921, 925, and 929, beforehand, synchronously with the sheet feeding timing, and the toner is transferred onto the sheets as the sheets are transported. The sheets to which the toner of each color is transferred are separated, transported by a transporting belt 939, and toner is fixed onto the sheets by a fixing unit 940. The sheets, upon exiting the fixing unit 940 are guided downwards by a flapper, and following the trailing end passing the flapper, the sheets are switched back and discharged. Thus, the sheets are discharged in a face-down state, and the pages are in order in the event of printing in order of pages.

The four photosensitive drums 917, 921, 925, and 929 are positioned with equal spacing therebetween, a distance d, the sheets are transported at a constant speed v by a transporting belt 939, synchronizing is performed for this timing, and the four semiconductor lasers 805 are thus driven.

<Configuration of Printer Unit 209 (Case of Monochrome MFP 105)>

Figure 10:
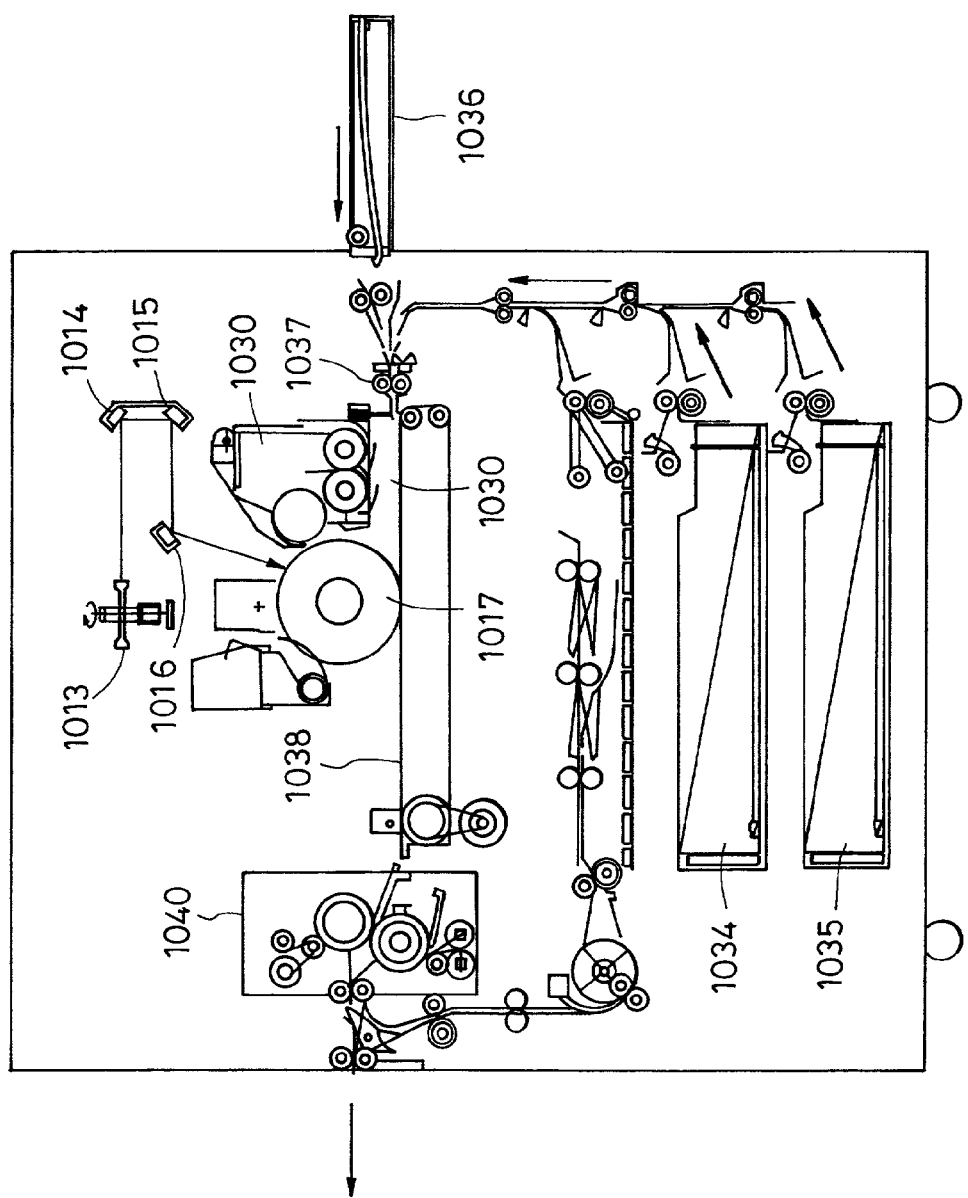
FIG. 10 is a diagram illustrating the printer unit of a B/W image forming device.

FIG. 10 shows a schematic view of the monochrome printer unit. Reference numeral 1013 denotes a polygon mirror, which receives laser beams emitted by four semiconductor lasers 805. The laser beams are scanned on the photosensitive drum 1017 via the mirrors 1014, 1015, and 1016. On the other hand, reference numeral 1030 denotes a developer for supplying black toner, which forms a toner image on the photosensitive drum 1017 according to the laser beams, whereby the toner image is transferred onto the sheet, thus allowing an output image to be obtained.

The sheets fed from one of sheet cassettes 1034 or 1035 or a hand-feed tray 1036 pass over a resister roller 1037 and are adhered to a transfer belt 1038, and thus transported. The toner image is formed on the photosensitive drums 1017 beforehand, synchronously with the sheet feeding timing, and the toner is transferred onto the sheets as the sheets are transported. The sheets to which the toner is transferred are separated, and the toner is fixed onto the sheets by a fixing unit 1040. The sheets, upon exiting the fixing unit 1040 are guided downwards by a flapper, and following the trailing end passing the flapper, the sheets are switched back and discharged. Thus, the sheets are discharged in a face-down state, and the pages are in order in the event of printing in order of pages.

<Configuration of Finisher Unit 209>

Figure 11:
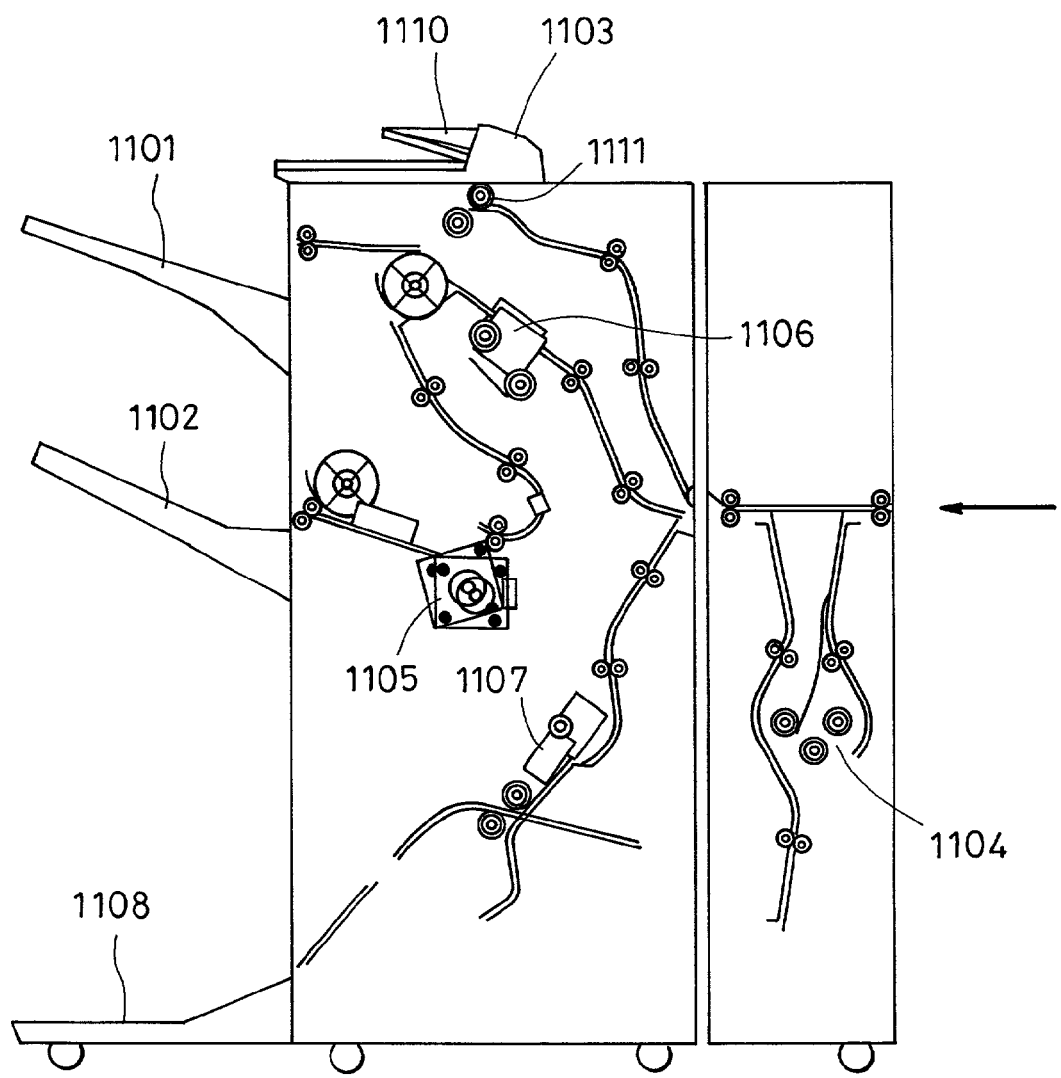
FIG. 11 is a diagram illustrating a finisher unit of an image forming device.

FIG. 11 shows a schematic view of the finisher unit. Sheets exiting the fixing unit 940 (or 1040) of the printer unit 209 enter the finisher unit 209. The finisher unit 209 has a sample tray 1101 and a stack tray 1102, and discharging is performed switching according to the type of job and the number of sheets.

There are two methods for sorting: one is the bin-sorting method wherein multiple bins are provided and the sheets are sorted to different bins, and the other is the shift-sorting method wherein the later-described electronic shifting functions and bins (or trays) are shifted in the deeper or closer directions, thereby sorting output sheets by job. The electronic sifting function are called collating, and in the event that the large-capacity memory described above is provided to the core unit, this buffer memory can be used to perform collating, which is changing of the order of pages and the discharge order buffered, and thus support electronic sorting functions. Next, while sorting involves sorting by jobs, group functions are functions for sorting by page.

Further, in the event of discharging to the stack tray 1102, an arrangement may be made wherein the sheets before discharge are accumulated by job, and are bound by a stapler 1105 immediately before being discharged.

As for other arrangements, there is a Z-folding device 1104 and a puncher 1106 for punching two (or three) holes in the sheets for filing, before reaching the above two trays, and processing is performed according to the type of job.

Further, a saddle stitcher 1107 binds the center portion of the sheets at two positions, and then folds the sheets in half by nipping the center portions thereof with rollers, thereby performing processing for creating booklets such as magazines or pamphlets. The sheets bound by the saddle stitcher 1107 are discharged to a booklet tray 1108.

In addition to this, while not shown in the drawings, it is possible to add binding involving gluing, or trimming of the edges following binding.

Also, an inserter 1103 sends sheets set in the tray 1110 to one of the trays 1101, 1102, or 1108, without going through the printer. This allows inserting sheets set in the inserter 1103 between sheets sent through the finisher 209. The user sets the sheets in the tray 1110 of the inserter 1103 face up, and the sheets are fed sequentially from the top by a pick-up roller 1111. Accordingly, the sheets from the inserter 1103 are transported to the trays 1101 and 1102 without change, and thus discharged in a facedown manner. In the event of sending these sheets to the saddle stitcher 1107, the sheets are sent to the puncher 1106 side and then switched back, thereby facing the same way.

<Configuration of Document Server 102>

Next, the document server 102 will be described with reference to FIG. 12.

Jobs input from the NIC 111 and the SCSI 114 enter the server by an input device control unit 1201, which acts to link various client applications to the server. PDL data and JCL (Job Control Language) data is accepted as input. This is state information relating to the printer and server, and corresponds to various clients, and the output of this module serves to link all appropriate components of PDL and JCL.

Next, an input job control unit 1202 manages lists of requested jobs, and creates a job list for accessing individual jobs which is handed over to the server. Further, this module has the three functions of job routing for determining the route of the job, job splitting for handling whether or not to divide and RIP, and job scheduling for determining the order of jobs.

One or a plurality of rasterizing processing (RIP) units 1203 exist. These may be increased in the manner of 1203-a, 1203-b, 1203-c, and so forth, but these will be collectively denoted by 1203 here. The RIP module subjects the PDL of various jobs to RIP processing, and creates bitmaps of appropriate sizes and resolution. Various formats for rasterizing processing regarding RIP processing can be used such as PostScript (a registered trademark of Adobe Systems Incorporated), PCL, TIFF, JPEG, PDF, and so forth.

A data converting unit 1204 serves to compress the bitmap images created by RIP and converting formats, and selects image types optimal for each of the printers. For example, in the event that a user desires to handle a job in increments of pages, TIFF, JPEG, or the like bitmap data rasterized at the RIP unit has a PDF header attached thereto, and processing is performed such as editing of PDF data, and so forth.

An output job control unit 1205 takes the page images of the job and manages how these will be handled based on command settings. The pages are either printed by the printer or saved in a hard disk 1207. Selection can be made whether or not to leave the printed jobs on the hard disk 1207, and in the event that the jobs are saved, these can be called up again. Further, this module manages the mutual action between the hard disk 1207 and a RAM 1208.

An output device control unit 1206 governs which device output is to be made to, or which devices will be clustered (connecting multiple devices and printing all at once), and this is sent to an interface card 112 or 113 of the selected device. Also, this unit serves to transmit the monitoring state and device state of the devices 104 and 105 to the document server 102.

Further, the output device control unit 1206 recognizes the connected presence and number of later-described protectors 116 via a server-side protector interface 115, and holds the recognition information. Note that multiple protectors 116 can be connected serially.

<Page Description Language (Hereafter, "PDL")>

Next, description will be made regarding PDL data. PDL, typified by the PostScript (a registered trademark of Adobe Systems Incorporated) language, can be classified into the following three:

(a) Image description by character code
(b) Image description by shape code
(c) Image description by raster image data That is to say, a PDL is a language which describes images with a combination of the above components, and data described thereby is referred to as PDL data.

Figures 13A, 13B:
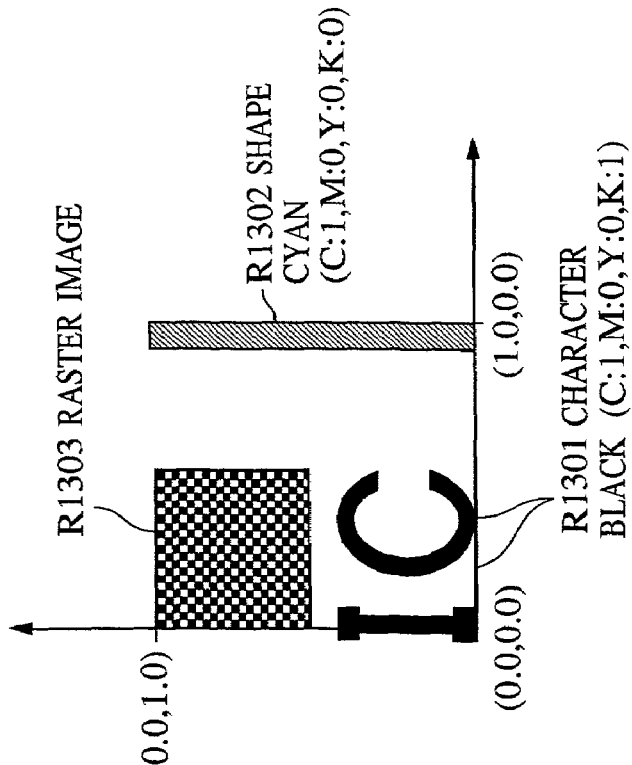
FIGS. 13A and 13B are diagrams illustrating an example of PDL data description and the state following raster rendering of PDL data.

FIG. 13A is an example describing character information R1301. Reference numeral L1311 is a description specifying the color of the characters, with the numbers in the parentheses referring to the concentration of Cyan, Magenta, Yellow, and Black, in that order. The minimum value is 0.0, and the maximum value is 1.0. L1311 specifies that the characters are to be black. Next, L1312 substitutes the character string "IC" into a variable String1. Next, L1313 indicates with the first and second parameters the x coordinate and y coordinate of the starting position coordinates on the sheet for laying out the character string, the third parameter indicates the size of the characters, the fourth parameter indicates the spacing between the characters, and the fifth parameter indicates the text string to be laid out. That is to say, L1313 is instructing that the text string "IC" be laid out with characters of size 0.3 and spacing 0.1 from the coordinates (0.0, 0.0).

Next, as an example wherein the shape information R1302 is described, L1321 and 1311 specify the color of lines in the same way, with Cyan being specified here. Next, L1322 instructs drawing lines, wherein the first and second parameters are the starting coordinates of the line, and the third and fourth parameters are the end coordinates of the line, each being x-y coordinates. The fifth parameter represents the heaviness of the line.

Further, as an example describing raster image information, L1331 substitutes the raster image into the variable image1. Here, the first parameter is the image type of the raster image, and the number of color components, the second parameter represents the number of bits per color components, and the third and fourth parameters represent the image size in the x direction and y direction of the raster image. The fifth parameter on is the raster image data. The number of pieces of raster image data is the product of the number of color components making up one pixel, and the image size in the x direction and the y direction. With the L1331, a CMYK image is made up of four color components (Cyan, Magenta, Yellow, Black), so the number of pieces of raster image data is 4×5×5=100. Next, L1332 indicates that iamge1 is to be laid out to the size of 0.5×0.5 at the position of coordinates (0.0, 0.5).

FIG. 13B illustrates the above three image descriptions within one page being interpreted and rendered as raster image data. R1301, R1302, and R1303 are each PDL data that has been rendered. These sets of raster image data are actually rendered to the RAM 1208 (or Image Disk 1207) for each of the CMYK color components, with C=0, M=0, Y=0, K=255 being written to the RAM 1208 for each of the CMYK color components for the portion of R1301 for example, and with C=255, M=0, Y=0, K=0 being written for the portion of R1302.

Within the document server 102, PDL data sent from the client 103 (or from the document server itself) is written to the RAM 1208 (or to the Image Disk 1207) in a form rendered into a rasterized image as described above, and saved as necessary.

<Network 101>

Next, the network 101 will be described.

Figure 14A:
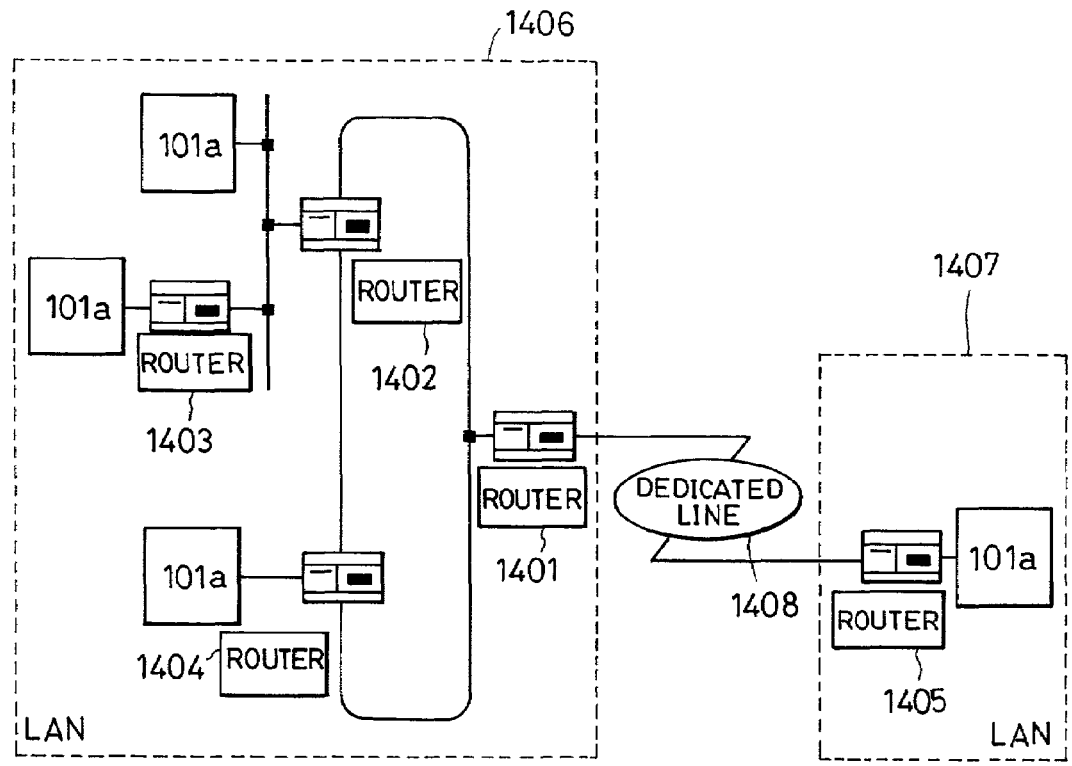
FIGS. 14A and 14B are diagrams illustrating a network environment and network data transfer.

As shown in FIG. 14A, the network 101 is connected to a device called a router for mutually connecting networks, having a configuration as shown in FIG. 1, thereby configuring another network called a LAN (Local Area Network).

Also, a LAN 1406 is connected to a router 1405 within another LAN 1407 through a dedicated line 1408, via an internal router 1401. Many such networks are configured one upon another, configuring a massive connection architecture.

Figure 14B:
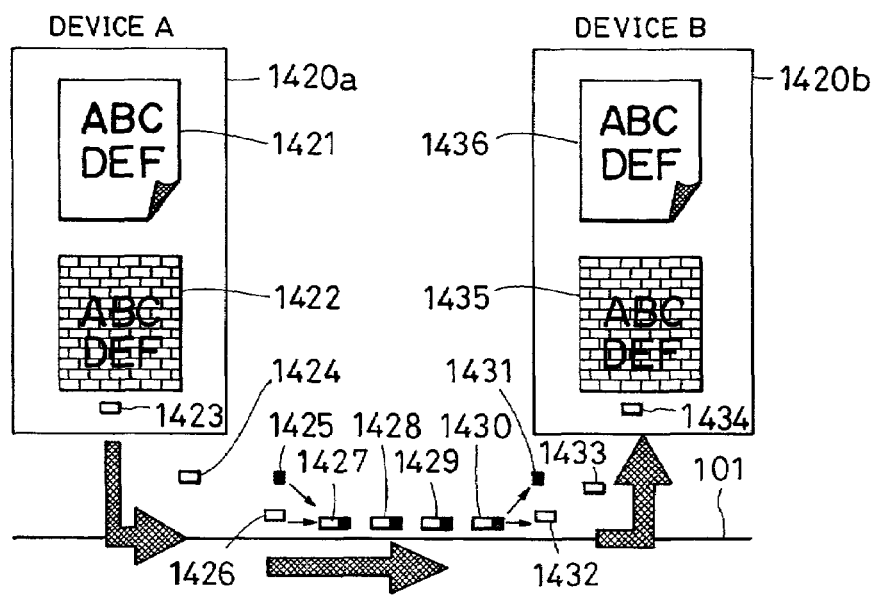

Next, the data flowing through this will be described with reference to FIG. 14B.

There is data 1421 in an originating device A (1420a). This data may be image data, or PDL data, or a program. In the event that this is transferred to a receiving device B (1420b) via the network 101, the data 1421 is divided into small portions such as conceptually represented by 1422. The divided data 1423, 1424, 1426, and so forth, has a destination address called a header 1425 attached thereto (in the event of using TCP/IP protocol, the IP address of the destination), and these pieces of data are sequentially sent onto the network 101 as packets 1427. Data 1432 wherein the address of the device B and a header 1431 of a packet 1430 matches is separated, and the data is restored to the state of data in the device A.

<Protector>

Figure 15:
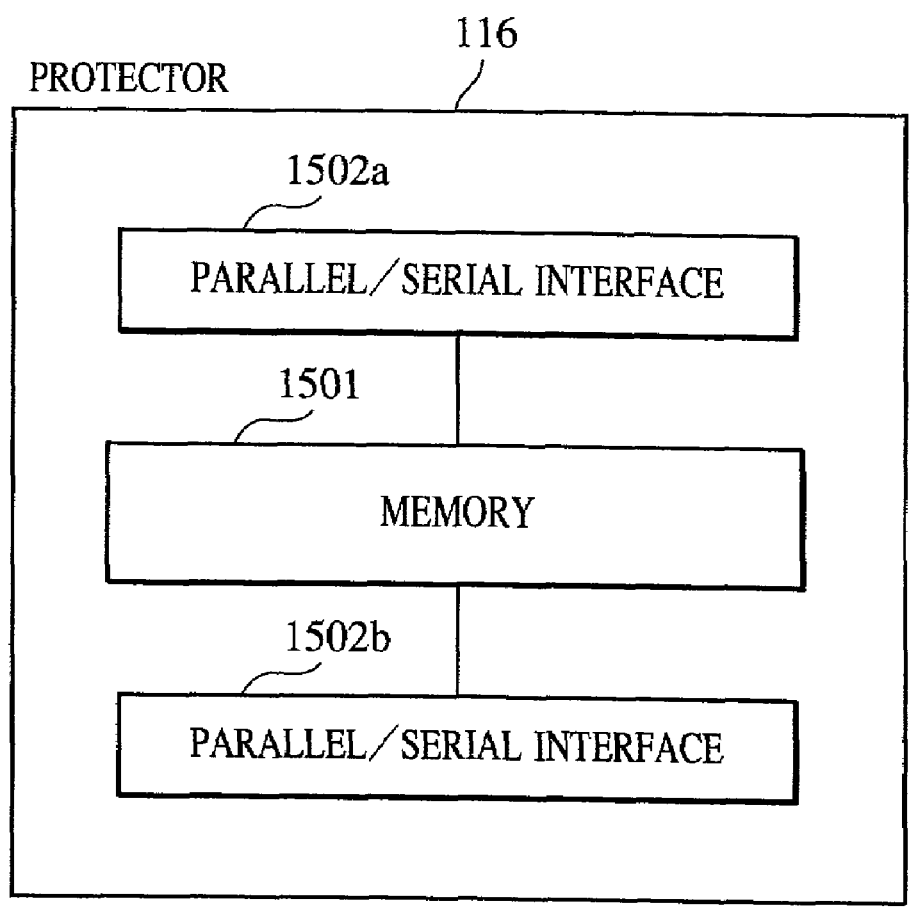
FIG. 15 is a block diagram of a protector.

Next, description will be made regarding the protector 116. As shown in FIG. 15, a protector 116 has a memory 1501, and also has male and female parallel/serial interfaces 1502a and 1502b, respectively, for external access to the memory 1501. Data indicating that this is from the present document server is written in the memory 1501, and the data is recognized by the document server 102 via the protector interface 1502a. That is to say, this protector by its existence serves as a device to substantiate the validity (hereafter referred to as "license") of use of certain software.

Now, one protector is capable of dealing with software licensing for one device. Accordingly, at the time of using processing software on the document server 102 for one device, a protector corresponding to the device must be mounted to the document server 102.

Also, connecting another protector 116 to the protector interface 1502b allows multiple protectors 116 to be connected.

Further, the server-side protector interface 115 can be set so as to store all license information stored in multiple protectors within a single protector, under instructions from a particular administration user. Connecting a protector to the document server 102 wherein M items of license information have been stored yields the same effects as connecting M protectors storing one item of license information each to the document server 102.

Also, the server-side protector interface 115 invalidates the license information of the protectors which have handed over the license information, when the license information of each of the protectors is stored in the one protector. This prevents unauthorized copying of license information.

The setting processing for such license information is executed by a particular administrator using the keyboard and display of the document server 102.

<Scanner Driver>

Next, description will be made regarding the scanner driver.

Figure 16:
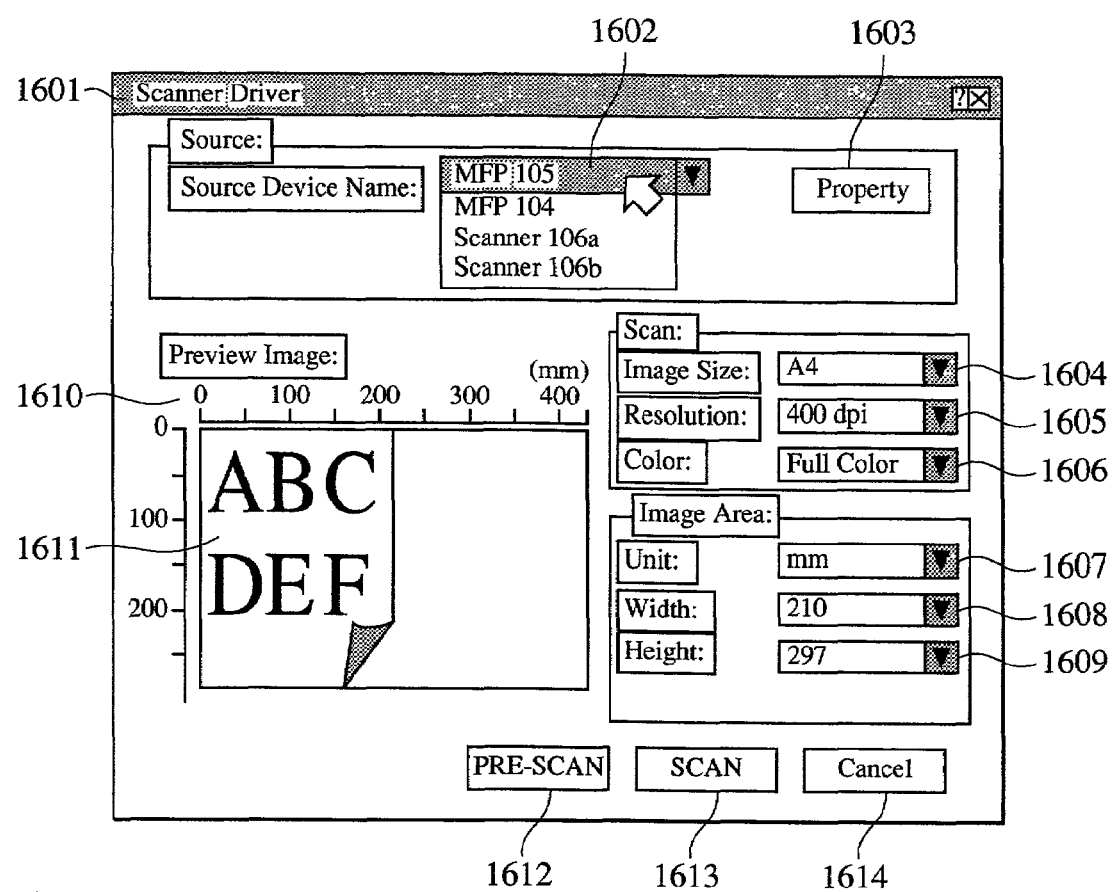
FIG. 16 is a diagram illustrating an example screen for a scanner driver.

FIG. 16 illustrates a GUI (Graphic User Interface) for instructing scanning operations of a scanner driver on a computer 102 (or 103), this allowing the user to specify desired setting parameters and to change desired images into data.

First, reference numeral 1601 denotes a scanner driver window, and one setting item therein is a source device selecting column 1602 for selecting an originator to serve as a target. Generally, this is a scanner 201 or the like, but this may be something brought from the memory 108 or taken in from a digital camera or the like. Reference numeral 1603 denotes an item for performing detailed settings regarding the selected source device. Clicking on this allows input of setting information unique to the device with a separate screen, selection of special image processing (e.g., character mode/photograph mode), and performance of image input by a corresponding processing mode. Next, reference numeral 1604 denotes an image size column for determining an image size, a resolution is input at 1605, and a color mode is selected at 1606. Also, reference numerals 1607 through 1609 are parts determining a size of an image area, with increments and vertical and horizontal lengths being input.

After performing these instructions, pressing a pre-scan key 1612 sends the instructions to the device selected with the device selecting column 1602, from the computer 102 (or 103), and image input is started. Here, this is a pre-scan, so image reading is performed at a resolution lower than the actual resolution, and the obtained image is displayed as a preview image on an area 1611 of the window 1601. A scale 1610 is displayed according to the increment 1607 of the image area set earlier.

In the event that the user judges the preview image to be acceptable, clicking a scan key 1613 performs scanning at the set resolution at this time. In the event that the preview image is not good, a pre-scan is made again for confirmation, and a cancel key 1614 is clicked in the event of canceling.

<Printer Settings>

Figure 17:
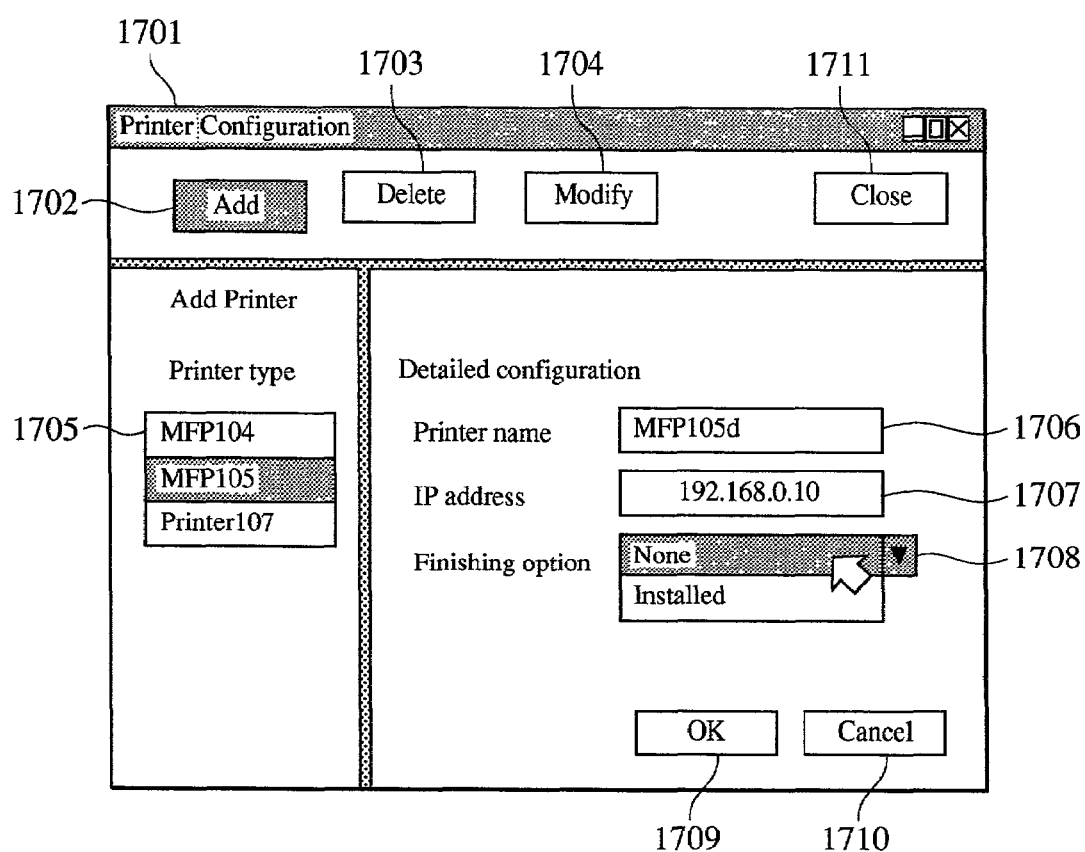
FIG. 17 is a diagram illustrating an example screen for printer settings.

The printer settings will be described with reference to FIG. 17. The printer settings are made at the computer 102 (or 103) from the GUI, thereby specifying the output destination of the print job or the input of the scanned image at the document server 102.

First, description will be made regarding the GUI.

Reference numeral 1701 denotes a printer setting window, and the user first selects adding 1702, modifying 1703, or deleting 1704, of printers. In the event that adding 1702 has been selected, selection of a printer type 1705 is made, following which detailed information according to the printer type is set. In the event that an MFP 105 connected to the network is selected, a printer name 1906, in IP address 1707, and an installation state of finishing options 1708 are set, following which selecting an OK key 1709 sets registration thereof. Also, in the event that registration is to be cancelled, the user can cancel the registration by not selecting OK 1709 but selecting a cancel key 1710 or a key 1711 for closing the window 1701.

Modifying 1703 and deleting 1704 are also performed in the same manner.

<Cluster Settings>

Figure 18:
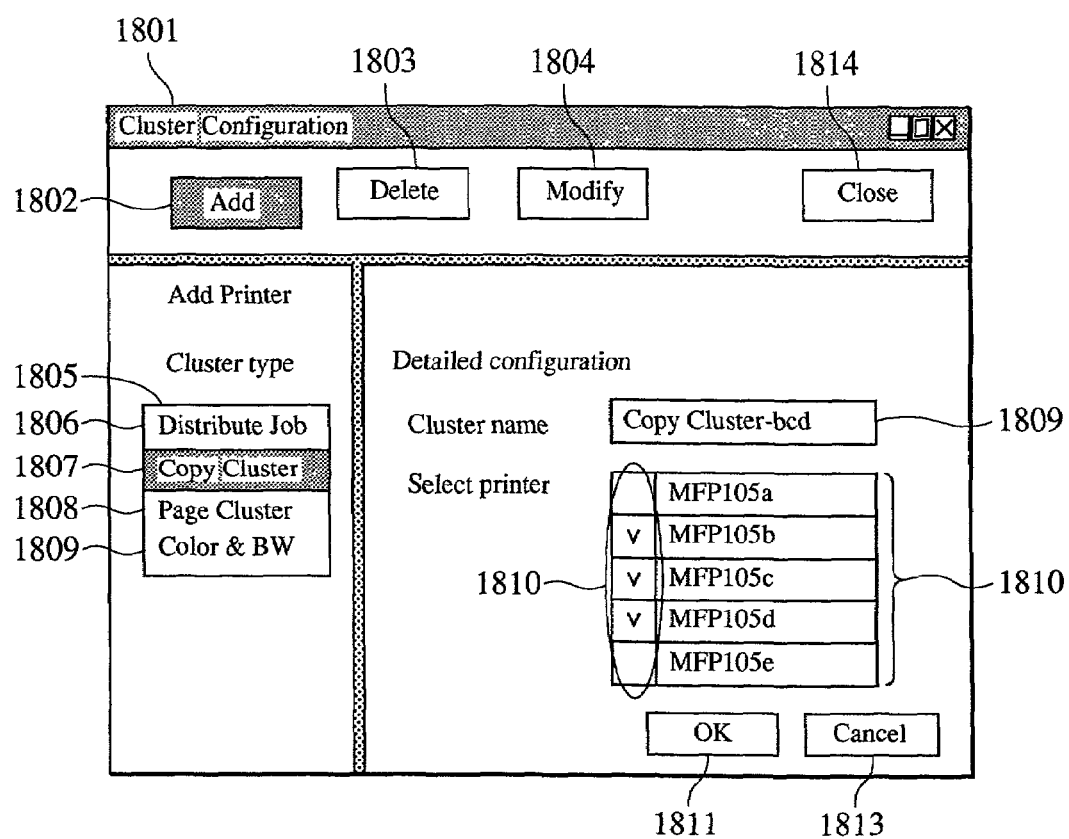
FIG. 18 is another diagram illustrating an example screen for printer settings.

Description will be made regarding cluster settings next, with reference to FIG. 18. With cluster settings, settings are made regarding which printers will be set as the output destination of a cluster (connecting multiple devices and printing all at once). Settings are made with the computer 102 (or 103) with the GUI.

Reference numeral 1801 denotes a cluster setting window, from which the user first selects adding 1802, modifying 1803, or deleting 1804, of clusters. In the event that the user selects adding 1802, a type of cluster 1805 (the method for distributing a job) is selected. Here, job distributing 1806, copy distributing 1807, page distributing 1808, and color & B/W distributing 1809 are provided. After selecting the type of cluster, the user inputs a cluster name 1810. Also, a list 1811 of printers which can be registered as output destinations for clusters registered in the printer settings is displayed, and the user checks the check boxes of the printers to be registered as output destinations of the cluster. Pressing an OK key 1812 registers the settings. Also, in the event that registration is to be cancelled, the user can cancel the registration by not selecting the OK key 1812 but selecting a cancel key 1813 or a key 1814 for closing the window 1804.

Modifying 1803 and deleting 1804 are also performed in the same manner.

<Printer Driver>

Figure 19:
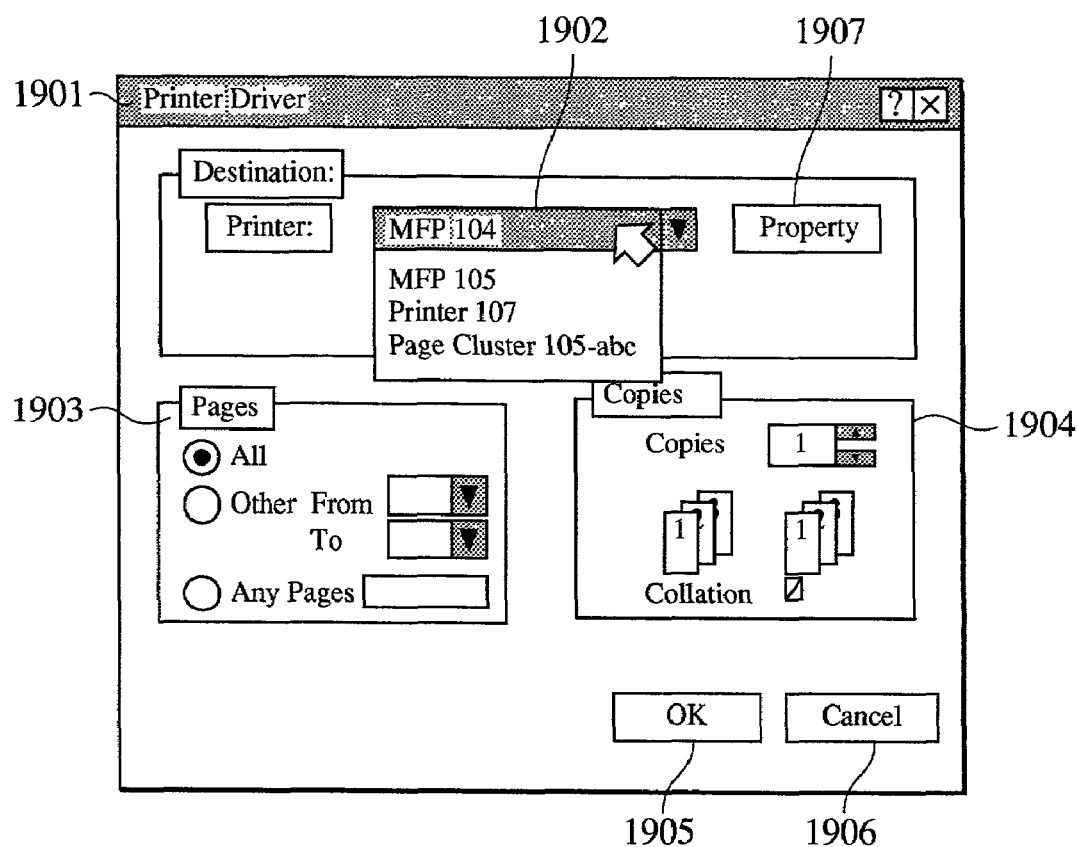
FIG. 19 is a diagram illustrating an example screen for a printer driver.

The process of sending image data to a printer from the computer 102 (or 103) with a printer driver will now be described with reference to FIG. 19. The printer driver is a GUI instructing the printer actions, and the user can instruct desired setting parameters by instructing using the printer driver, thus sending desired images to destinations such as printers.

Here, reference numeral 1901 denotes the printer driver window, wherein, as an item to be set, 1902 denotes a destination selection column for selecting destinations to serve as targets. Generally, these would be the above-described MFPs 104 and 105, the printer 107, or clusters registered by cluster registering. Reference numeral 1903 denotes a page setting column for selecting output pages from the job, for deciding which pages of an image created with application software that operates on the computer 102 (or 103). Reference numeral 1904 denotes a copies setting column for setting a number of copies to be made. Also, reference numeral 1907 denotes a property setting key for inputting detailed settings regarding the destination devices selected with the destination selection column 1902. Clicking on this and inputting setting information unique to that device in another screen, and setting parameters for special image processing, such as parameters for the gamma converting unit 702 within the printer IP unit 207 and the spatial filter unit 703, allows even finer color reproduction and sharpness adjusting to be performed.

Once the desired settings are made, the user presses an OK key 1905 and printing starts. This can be cancelled by pressing a cancel key 1906, which cancels the printing.

<Job Submitter>

Figure 20:
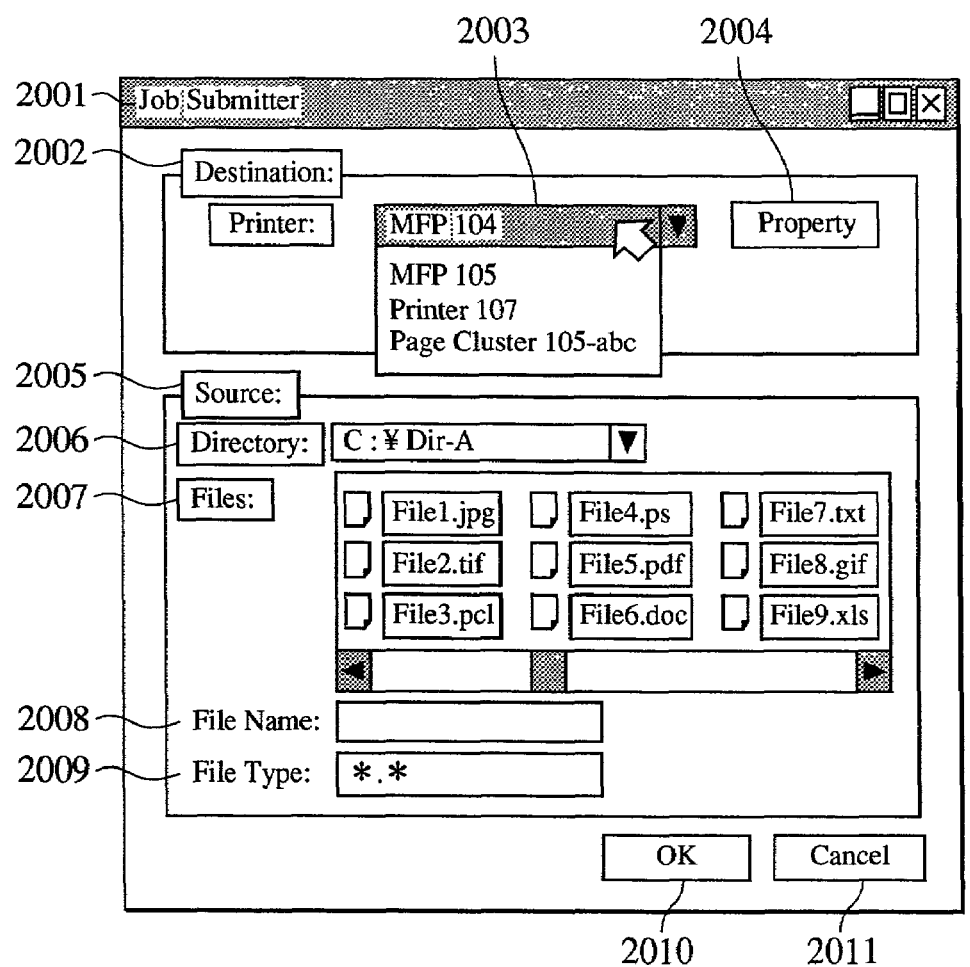
FIG. 20 is a diagram illustrating an example screen for a job submitter.

The job submitter will be described with reference to FIG. 20. This is used in the same manner as with the above-described print driver, but this is a tool for handing a file on a client 103 to the document server 102, and this differs from the above arrangement, wherein the print driver starts an application on the client 103 and converts that data into a format such as PS or PCL, which is then handed to the document server 102, in that the job submitter directly sends data of various formats to the document server 102.

An item to be set is a destination selection column 2002 for selecting the output destination to serve as a target. Generally, these would be the above-described MFPs 104 and 105, the printer 107, or clusters registered by cluster registering. Reference numeral 2005 denotes a page setting column for selecting output pages from the device, and an arbitrary file within the computer 102 (or 103) can be selected and handed to the document server 102. Further, there is a property key 2004 for making detailed settings. Clicking on this brings up a job ticket menu for the next page. Once the desired settings are made, pressing an OK key 2010 transmits the job to the document server 102, and canceling can be made by selecting a cancel key 2011.

<Job Tickets>

Figure 21:
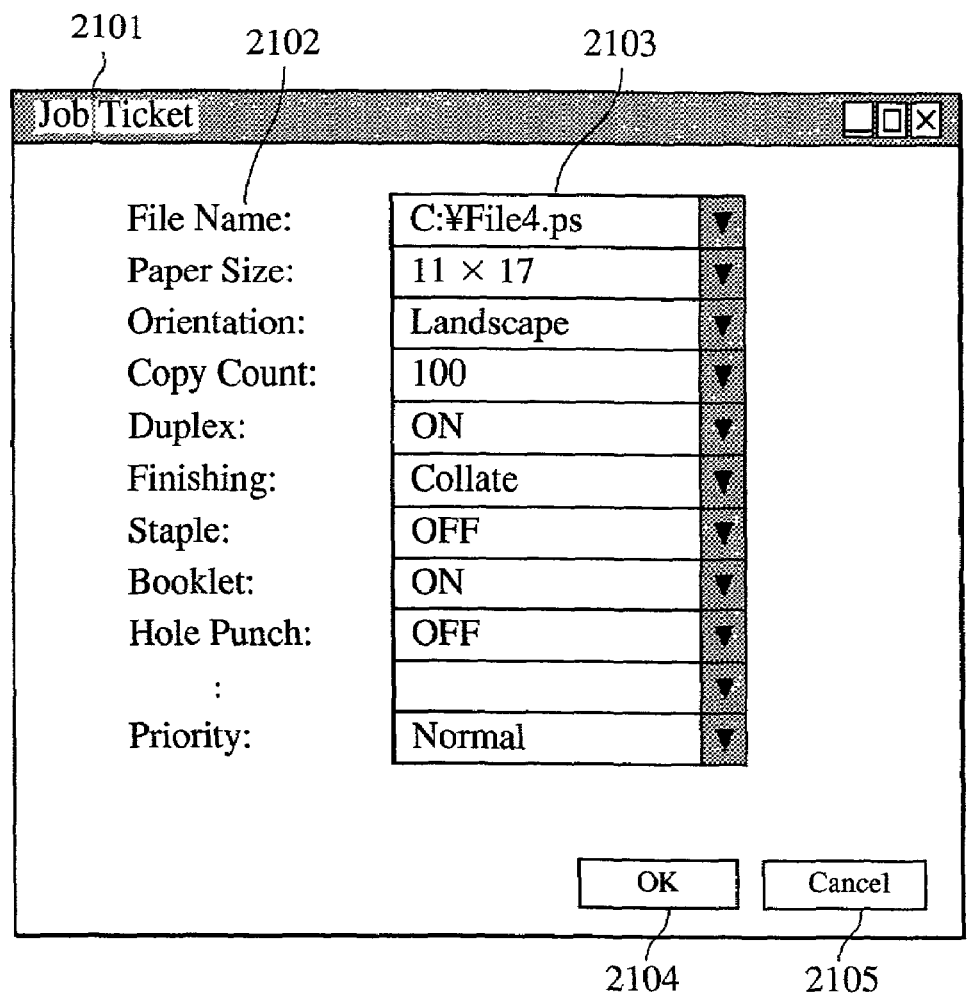
FIG. 21 is a diagram illustrating an example screen for a job ticket.

Next, description of job tickets will be made with reference to FIG. 21. Clicking the properties key of a print driver such as that shown in FIG. 19 or a job submitter such as that shown in FIG. 20 (1907 or 2004) brings up a job ticket setting screen such as shown in FIG. 21.

The job ticket is displayed with individual setting items 2102 corresponding to the destination 1902 or 2002 serving as a target, in a setting screen wherein the user freely selects functions unique to the MFPs 104 and 105 or printer 107 or the like. At this time, the user can select arbitrary selection items 2103.

For example, ON and OFF keys are provided in the Duplex setting column, wherein setting this to ON prints both sides of a sheet, and setting this to OFF prints a single side of a sheet. Note, however, that in the event that a printer that does not have duplex printing functions is selected, an arrangement is made such that this item is not displayed. Single-side printing is most commonly used, so Duplex is set to OFF as a default setting.

Also, the items set here include not only finishing functions, but also basic functions of the printer such as image processing parameters, number of copies, sheet size, etc., can be selected and modified.

Once the desired settings are completed, clicking on an the OK key 2104 returns to the job submitter screen, and this can be cancelled by pressing a cancel key 2105.

<Device Status>

A standardized database called a MIB (Management Information Base) is configured within the network interface unit of the MFPs 104, 105, and printer 107, communicating with computers on the network via a network management protocol called SNMP (Simple Network Management Protocol), which enables exchange of necessary information regarding the state of devices connected to the network such as the MFPs 104 and 105 with the computer 102 (or 103).

For example, this allows detecting what sort of finisher 210 with what functions is connected, as the mounting information of the MFPs 104 and 105, whether or not errors or jamming are currently occurring, as status information, and whether in a printing or idle state, i.e., this enables obtaining of a device state, and a network settings job history, as well as management of a usage state, control, and other such static data.

Figure 22:
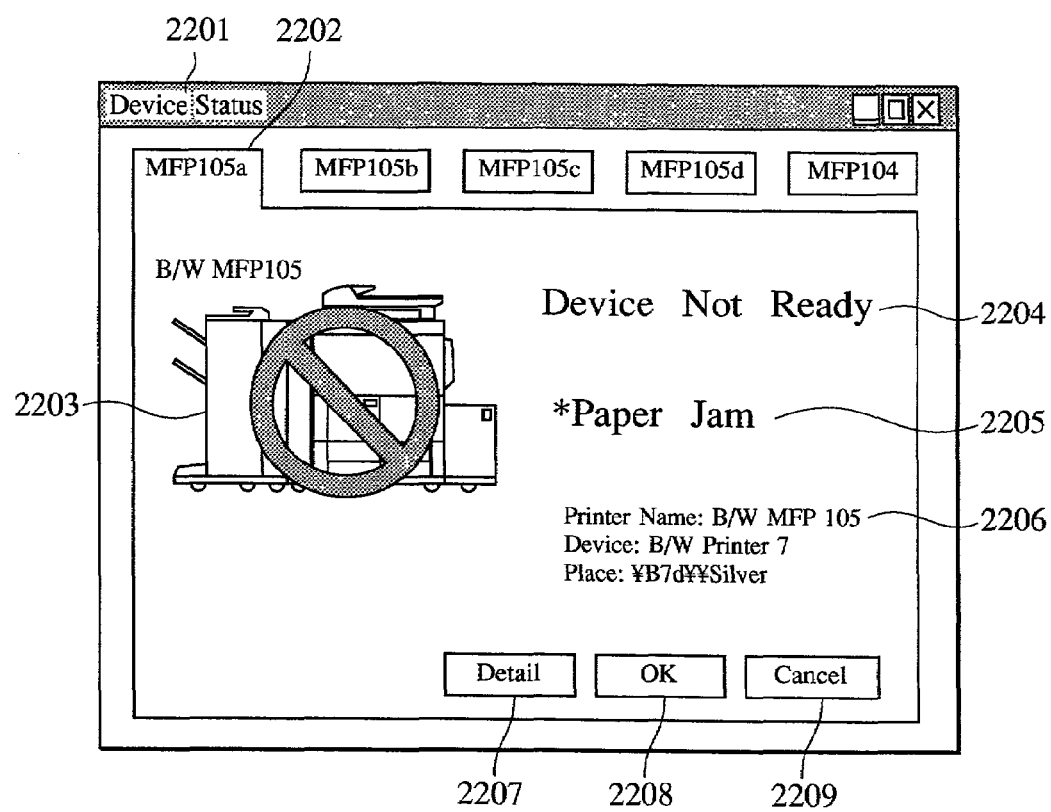
FIG. 22 is a diagram illustrating an example screen for device status.

FIG. 22 is a GUI (Graphic User Interface) of a utility representing a device status. For example, in the event that a tab 2202 of the MFP 105a is selected, the device mounting information of the MFP 105a is depicted by graphics 2203, and the state of the device can be judged with displayed information 2204 and 2205 as well.

<Job Status>

A job status screen 2301 will be described with reference to FIG. 23. Three statuses are shown in the job status screen 2301, which are a job status 2302 for knowing a state of the job within the document server, a print status 2303 for notifying a state of the job handed to the printer, and a finished job 2304 which provides a history of a completed job.

The job status 2302 is represented as either "Waiting" (before RIP) or "Ripping" (after RIP), and following RIP this is handed to the subsequent print status.

The print status 2303 is in a normal state represented as "Waiting" (standing by for printing) or "Printing", and in the event that an error or jam occurs, a display is made to that effect, and following printing, this is handed to the subsequent finished job.

The finished job status 2304 allows the user to see the history of the job, and in the event that the job has finished normally, "Printed" is displayed, and in the event that the job has been cancelled before completion, "Cancelled" is displayed.

<Job Distributing>

Figure 24:
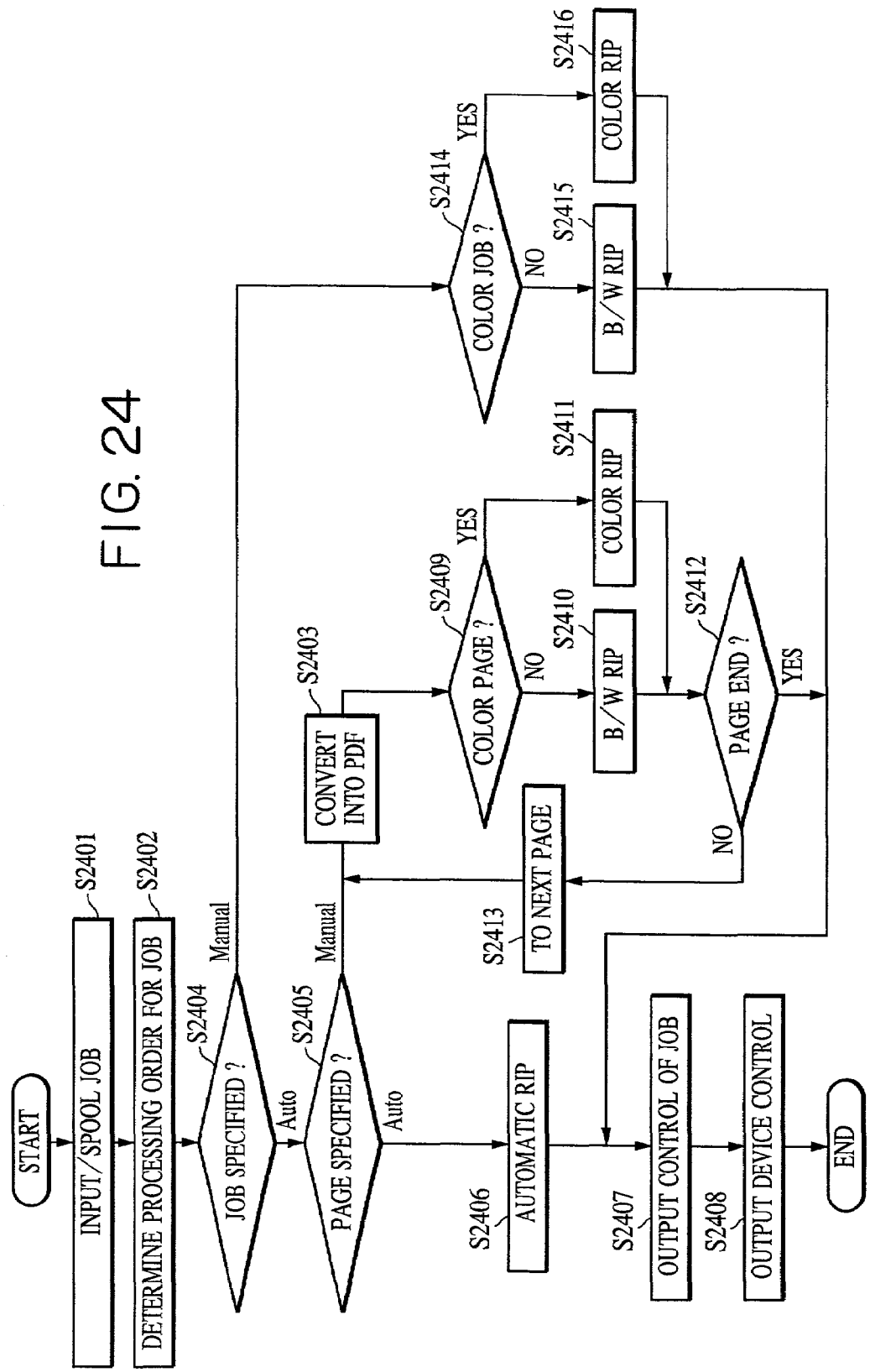
FIG. 24 is a flowchart of splitting a job with mixed color and B/W.

Next, a case wherein color images and B/W images exist in the same job will be described with reference to FIG. 24. At this time, the printer selection is made for color & B/W cluster printing from either a driver or the Destination in the job submitter, from the document server 102 of the client 103. The job is then sent to the document server 102.

The sent job is temporarily spooled in step S2401, and a processing order is determined in step S2402 with consideration given to job priority and the like. In step S2404, in the event that the sent job has been manually set to either an all-color job or an all-B/W job, the flow proceeds to step S2414. Further, in the event that the overall job instructs B/W RIP, B/W RIP is performed (S2415) and in the event that this instructs color RIP, color RIP is performed (S2416), whereby B/W jobs are output to a B/W MFP 105 and color jobs are output to a color MFP 105, and thus printed.

On the other hand, in the event that Auto is specified in step S2404, the flow divides at whether or not there has been page specification made (step S2405), and in the event that this is Manual, the flow proceeds to step S2403. In step S2403, first, the job is converted into a format managed in increments of pages, so that the sent job can be RIPped in increments of pages. Here, the job is converted to a PDF (Portable Data Format) file. Next, pages wherein B/W pages have been instructed are subjected to B/W RIP (step S2410), and pages wherein color pages have been instructed are subjected to color RIP (step S2411), as specified in increments of pages beforehand. This task is performed to the end page, then proceeds to the job output control unit step S2407, the output device control step S2408 is executed, and the B/W pages are output to the B/W MFP 105 and the color pages are output to the color MFP 104, respectively.

<Cluster Printing>

Cluster printing is a method wherein printing is performed from multiple connected printers all at once, and is an action wherein, for example, printing is made from the document server 102 to four B/W MFPs (105a through 105d) or a color MFP 104 and B/W MFP 105, simultaneously.

With a job having both color and B/W, and which has been distributed for respective color and B/W RIP, the destinations, i.e., the color MFP 104 and B/W MFP 105 are determined by the output device control unit (1206 in FIG. 12), and the job is sent to the respective printers, where output is performed.

This clustering printing may be performed by clusters of multiple B/W printers, clusters of multiple color printers, or clusters of one or multiple color printers and one or multiple B/W printers.

<Job Splitting>

Further, in the event of performing cluster printing, there are the following three methods for distributing data.

(a) Job distributing: A load-balancing method wherein idle printers are found and job 1 is distributed to MFP 105a, job 2 is distributed to MFP 105b, and so forth, so that all printers have an even quantity of jobs appropriated thereto and the number of jobs in a waiting state is reduced as much as possible.

(b) Copy distributing: A method wherein the copies of one job are evenly output by clustered printers (in the event that the number cannot be perfectly divided, the remainder is appropriated accordingly).

(c) Page distributing: A method wherein the pages of a single job are evenly output by clustered printers (in the event that the number cannot be perfectly divided, the remainder is appropriated accordingly).

Next, an example according to the present embodiment will be described wherein, in the event that software is illegitimately copied to other computers, the image forming devices are prevented from printing.

<Adding Printers>

Figure 25A:
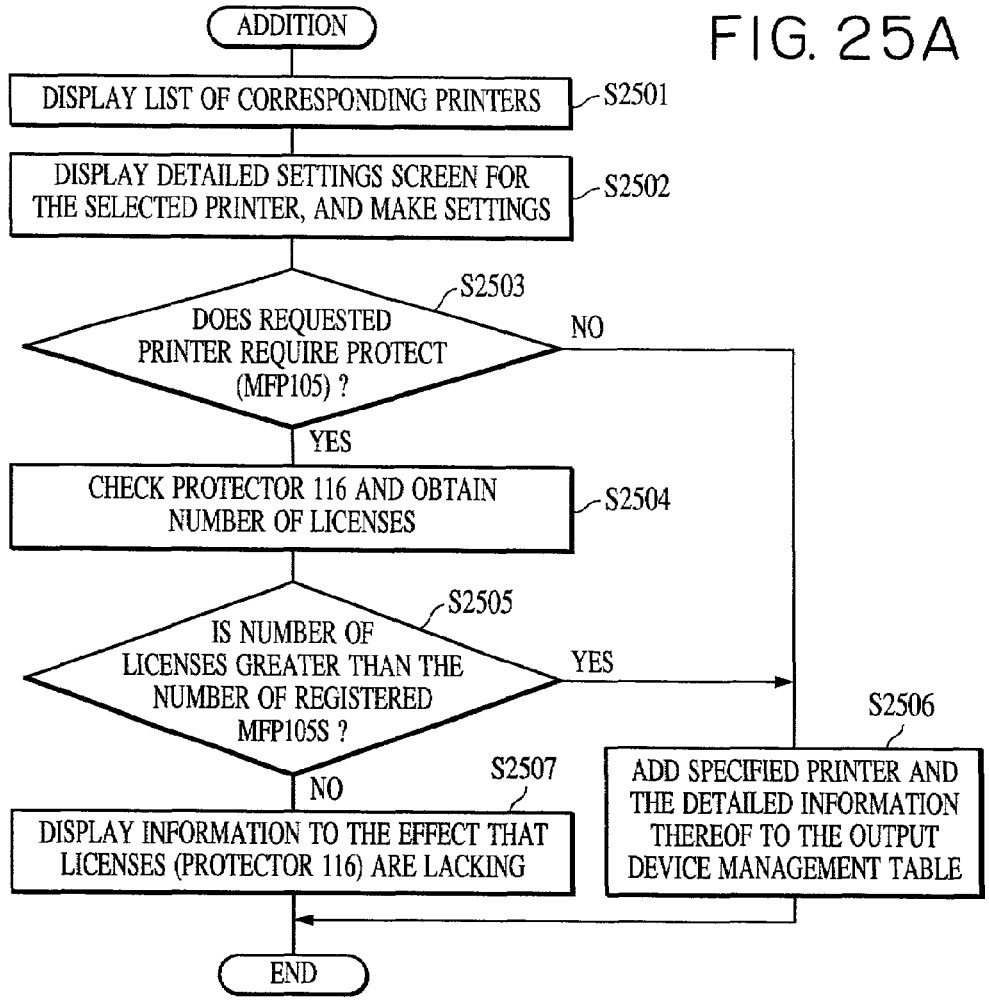
FIGS. 25A through 25C are flowcharts illustrating adding printer settings, changing printer settings, and deleting printer settings.

Now, description will be made regarding a case wherein the user selects adding 1702 from the printer setting screen 1701, with reference to FIG. 25A.

In the event that the user selects the adding key 1702, in step S2501 the document server 102 displays a list of printers corresponding to the document server within the printer setting screen 1701. Next, the user selects a key 1705 for the type of printer to add, and a screen for setting detailed information according to the type of selected printer comes up.

Then, the user sets detailed information, and when the OK key 1709 is clicked in step S2503, the output device control unit 1206 judges whether or not the printer regarding which adding has been requested is connected to the general-purpose interface network, and whether it is an MFP 105 that requires one protector per printer.

In the event that judgement is made in step S2503 that the printer requires a protector, the output device control unit 1206 confirms the number of protectors 116 connected, and whether or not data is written to the memory 1501 for each of the protectors 116 that the protectors are protectors of the present document server, via the server-side protector interface 115, and also confirms the number of MFPs 105 which can be registered as printing destinations of the document server 102 (hereafter referred to as "number of licenses for MFPs 105"). The number of licenses for MFPs 105 recognized in step S2504 is compared with the number of MFPs 105 in the output device administration table stored in the RAM 1208 (hereafter referred to as "number of registered MFPs 105"), by the output device control unit 1206 in step S2505.

Now, as shown in FIG. 26, the output device administration table is a data group made up of the printer type 2602, name 2603, and detailed information 1604 such as finishing options according to the type and installation states of the printers registered as the printing destinations of the document server 102 in the printer settings.

Then, in step S2505, in the event that judgement is made that the number of registered MFPs 105 is less than the number of licenses, in step S2506 the specified printer is added to the output device administration table 2601 in the RAM along with the detailed information thereof, and the MFP 105 is registered anew as a printing destination of the document server 201.

Figure 27:
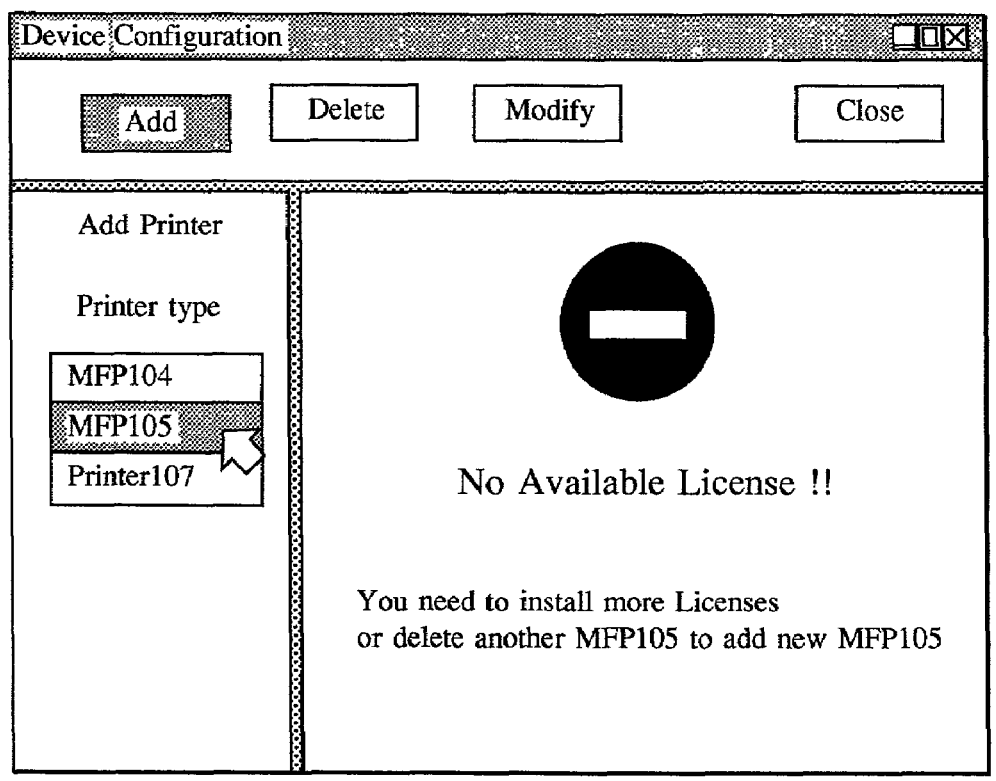
FIG. 27 us a diagram illustrating an example screen for printer settings in the event that there are not enough licenses.

On the other hand, in step S2505, in the event that judgement is made that the number of registered MFPs 105 is equal to the number of licenses, or that the number of registered MFPs 105 is more than the number of licenses, a screen such as shown in FIG. 27 is displayed in step S2507, to the extent that the number of licenses for MFPs 105 is insufficient, thus prompting the user to add more protectors or to delete a registered MFP 105.

In the event that judgement is made in step S2503 that protectors are not required, the set printer is added to the output device administration table 2601 in step S2506, and this is registered as a printing destination of the document server 102.

<Modifying Printers>

Figure 25B:
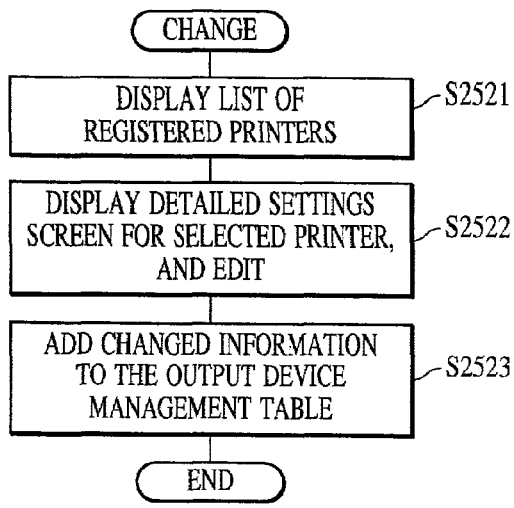

Description will be made regarding a case wherein the user selects the modifying key 1703 from the printer setting screen 1701, with reference to FIG. 25B.

In the event that the user selects the modifying key 1703, in step S2521 the document server 102 displays a list of printers corresponding to the document server within the printer setting screen 1701.

The user selects a desired printer from the list of printers displayed, and a screen for setting detailed information for the printer selected in step S2522 comes up, as with 1706 through 1708.

Next, after the detailed information has been modified in step S2523, once the user selects the OK key 1709 the output device control unit 1206 updates the output device administration table 2601 based on the modified contents, in step S2524.

<Deleting Printers>

Figure 25C:
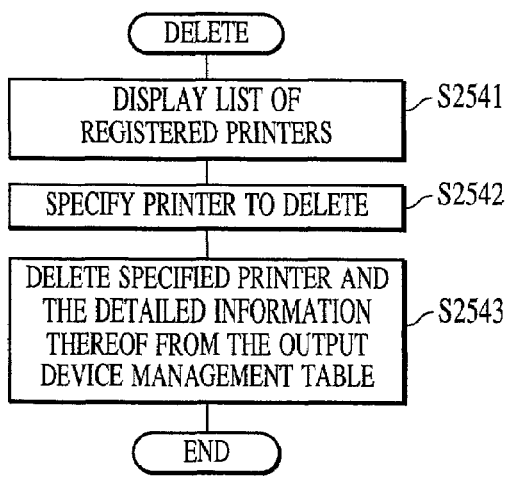

Description will be made regarding a case wherein the user selects the deleting key 1704 from the printer setting screen 1701, with reference to FIG. 25C.

In the event that the user selects the deleting key 1704, in step S2541 the document server 102 displays a list of printers registered with the output device administration table 2601 within the printer setting screen 1701.

In step S2542, the user selects a desired printer from the list of registered printers displayed, and once the user selects the OK key 1709, in step S2543 the output device control unit 1206 deletes the printer regarding which deletion has been instructed, from the output device administration table 2601.

Thus, allowing only a number of MFPs 105 corresponding to the number of protectors prevents software having server functions or controller functions being illegitimately copied and printing being performed on image forming devices.

(Second Embodiment)

<Printing Jobs>

Figure 28A:
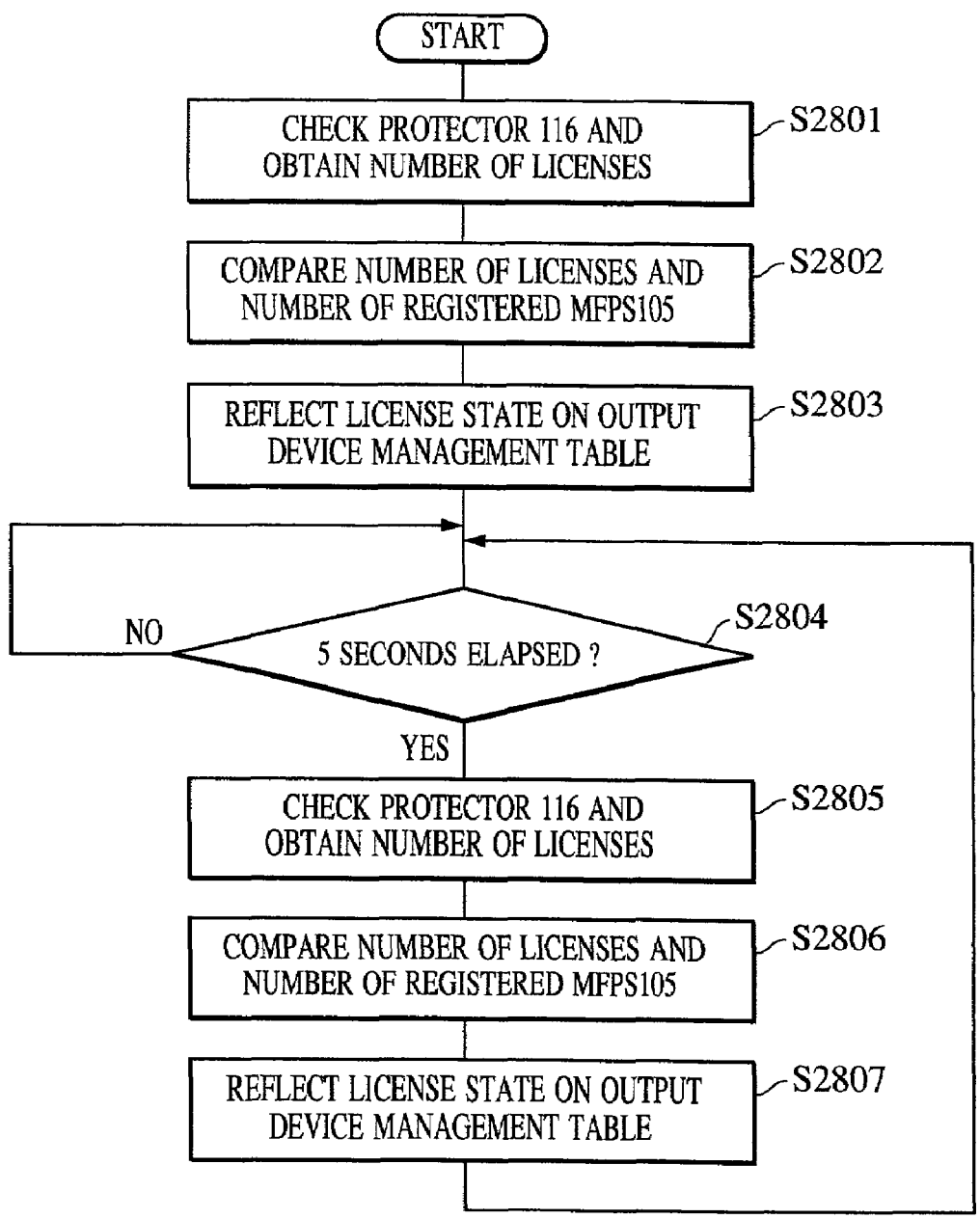

An example of a job being printed with an image forming system according to a second embodiment will be described with reference to FIGS. 28A and 28B.

After starting up the document server 102, in step S2801 the output device control unit 1206 confirms the number of protectors 116 connected, and whether or not data is written to the memory 1501 in each of the protectors 116 that the protectors are protectors of the present document server, via the server-side protector interface 115, and confirms the number of licenses for MFPs 105.

The number of licenses for MFPs 105 recognized in step S2801 is compared with the number of MFPs 105 in the output device administration table stored in the RAM 1208 by the output device control unit 1206.

In step S2802, in the event that judgement is made that the number of licenses M for MFPs 105 is less than the number N of registered MFPs 105, in step S2803 the output device control unit 1206 makes description to the effect that of the MFPs 105 in the output device administration table 2601, M units have licenses, and N minus M units do not have licenses, and initializes the license information of the output device administration table 2601.

Here, for example, in the event that the number of licenses M for the MFPs 105 is three, and the number of MFPs 105 is four, description is made that there are licenses for three (M) arbitrarily selected MFPs 105, and that one (N-M) MFP 105 does not have a license. Here, the three first MFPs 105 in the output device administration table 2601 are set to have licenses, but which of the MFPs 105 are to be appropriated licenses can be arbitrarily decided.

Also, in step S2802, in the event that judgement is made that the number of licenses is equal to or more than the number of registered MFPs 105 all registered MFPs 105 have licenses in step S2803.

In step S2804, following a predetermined amount of time (5 seconds in this case), the output device control unit 1206 recognizes the number of licensees for MFPs 105 again in step S2805, and again in step S2806 compares the number of licensees for MFPs 105 with the number of registered MFPs 105. Then, in step S2807, the contents of the output device administration table 2601 are updated by the output device control unit 1206 in the same manner as with step S2803. The series of steps S2804 through S2807 is repeated until the document server 102 is shut down. Thus, the licensing state at the document server 102 is constantly monitored, and the state thereof is reflected in the output device administration table 2601.

Figure 30:
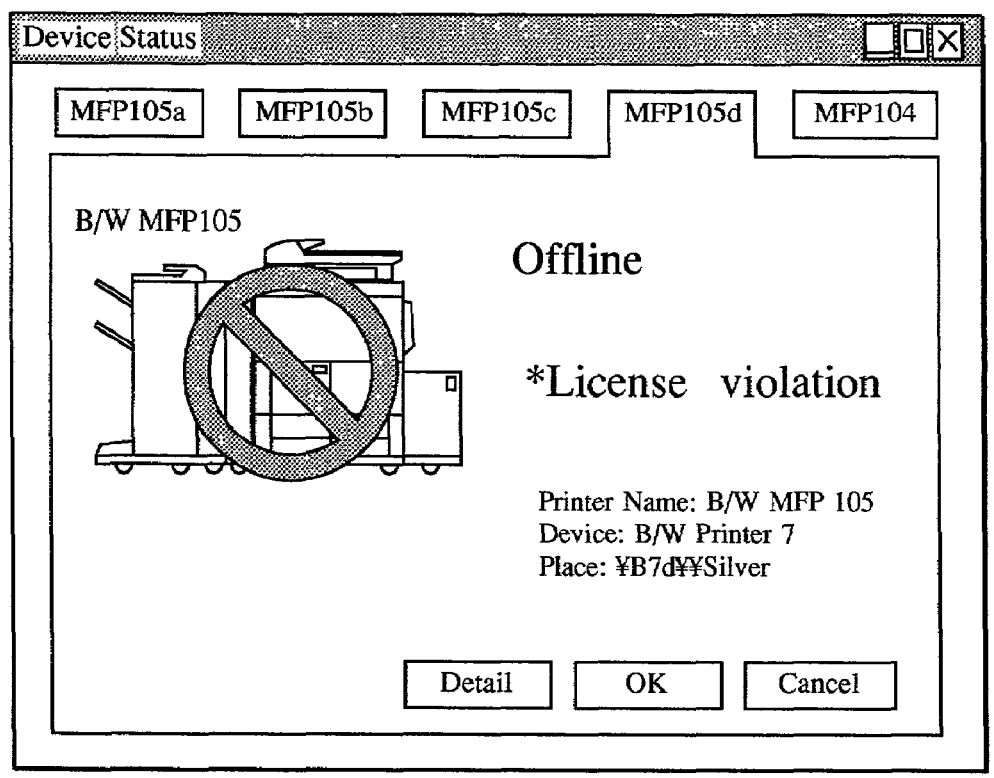
FIG. 30 is a diagram illustrating an example screen for the device status according to the second embodiment.

Also, the user is notified of MFPs 105 without licenses by making a display on the device status screen such as shown in FIG. 30.

Next, description will be made regarding a case of the document server 102 outputting print jobs.

As described in the first embodiment, the document server 102 follows instructions contained in jobs handed by a driver or job submitter within the document server 102 or client 103 so that the job is rendered to a bitmap having a resolution corresponding to the output device at the rasterizing processing (RIP) unit, and output to the specified printer is performed by the output device control unit 1206.

Now, the operation of the output device control unit 1206 at the time of output to the printer will be described with reference to FIG. 28B.

In step S2821, the output device control unit 1206 that has been instructed to output the job (printing) analyzes which printer to make output to. Then, in step S2822, judgment is made whether to perform output to multiple clustered printers as the output destination thereof, or whether to make output to a single printer (not clustered). In the event that judgement is made in step S2822 that cluster output is to be performed, in step S2823 the output device control unit 1206 judges from which of the clustered printers output is to be made, based on the job instructions, and confirmation is made in step S2824 whether or not there are any MFPs 105 needing licenses in the printers judged in step S2823. In the event that judgment is made in step S2824 that there are MFPs 105 needing licenses, output of jobs appropriated to the printers which do not need licenses is started in step S2825, the one or multiple MFPs 105 at issue are checked against the output device administration table 2601 which reflects the constantly-monitored license state of each in step S2826, thereby judging whether or not there are licenses. The jobs appropriated to the MFPs 105 that have been judged to not have licenses are stopped in step S2827, and the user is notified that there are not enough licenses with a job status screen such as shown in 3101 in FIG. 31. Subsequently, the output device administration table 2601 is monitored in step S2828, and printing is started in step S2829 as soon as the licenses are obtained.

Also, MFPs 105 which are judged to have licenses in step S2826 output the jobs appropriated by the output device control unit 1206, in step S2829.

In the event that a printer is judged to not need a license in step S2824, the printer outputs the job appropriated thereto in step S2825.

On the other hand, in the event that there is output to a single printer in S2822, in step S2830 judgment is made whether or not the printer is a printer needing a license, and in the event that judgment is made that the printer is an MFP 105 needing a license, the printer is checked against the output device administration table 2601 which reflects the constantly-monitored license state in step S2831, thereby judging whether or not there is a license. In the event that judgment is made that there is no license, output of the job is stopped in step S2827 by the output device control unit 1206, the output device administration table 2601 is monitored in step S2828, and printing is started in step S2829 as soon as the licenses are obtained. In the event that a job is judged to be to a printer that does not need a license in step S2830, the output device control unit 1206 outputs the job to the corresponding printer in step S2825.

According to this method as well, printing is only performed with MFPs 105 as far as the number of protectors allows, so unauthorized copying of software of the server functions or controller functions being used to print with image forming devices can be prevented.

As described above, according to the above embodiments, security of software having server functions or controller functions can be protected, since even in the event that software having server functions or controller functions is illegitimately copied to other computers, printing by image forming apparatus connected via general-purpose interfaces can be prevented.

The present invention can also be achieved by an arrangement wherein a storing medium storing software program code for realizing the functions of the above embodiments is supplied to a system or device, and the system or device computer (or CPU or MPU) is operated according to the program code stored in the storing medium.

In this case, the program code itself read out from the storing medium realizes the functions of the above-described embodiments, and the storing medium storing the program code comprises the present invention. Examples of storing mediums which can be used for storing the program code include floppy disks, hard disks, optical disks, magneto-optical disks, CD-ROMs, CD-Rs, magnetic tape, non-volatile memory cards, ROM, and so forth.

Also, the present invention encompasses cases not only where the computer executing the supplied program code manifests the functions of the above embodiments, but also where the operating system or the like running on the computer performs part or all of the actual processing according to the instructions of the program code, thereby manifesting the functions of the above embodiments.

Further, the scope of the present invention also encompasses arrangements wherein the supplied program code is written to memory provided to expansion boards or function expansion units inserted into the computer, following which a CPU or the like provided to the function expansion boards or function expansion units performs all or part of the actual processing based on instructions of the program code, so as to realize the functions of the above embodiments thereby.

As described above, according to the present invention, unauthorized use of software having server functions or controller functions can be effectively prevented.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming system including a server and client computers and at least one image forming device which communicates with said server, and devices of which one or a plurality can be connected to the server, said system comprising:

input means for inputting to the server a job to be printed by an image forming device;

rendering means for rendering the job input by said input means into an image;

output means for outputting an image rendered by said rendering means to an image forming device specified by the job;

setting means for setting the specified image forming device as an output destination at the server;

output destination information holding means for holding a number of image forming devices set as output destinations by said setting means;

displaying means for setting dialog on a display unit which shows information of said image forming devices;

recognizing means for recognizing a presence of devices connected to the server, and a number thereof connected in response to obtaining instruction to add new image forming devices as output destinations, wherein said instruction is input via said display unit; and determination means for determining a number N of the devices connected to the server that have been recognized by said recognizing means, and a number M of image forming devices already set as output destinations by said holding means and said new image forming device, when the specified image forming device is set as an output destination by said setting means, wherein, in an event that said determination means judges M to be less than N, setting of the specified image forming device as the output destination is permitted, and the number of image forming devices set as output destinations held by said holding means is updated, and, in an event that said determination means judges N and M to be equal, setting of the specified image forming device as the output destination is not permitted, and wherein said output means outputs the image rendered by the rendering means via the specified image forming device when setting of the specified image forming device as the output destination is permitted, and said output means does not output the image rendered by the rendering means via the specified image forming device when setting of the specified image forming device as the output destination is not permitted.

2. An image forming system including a server and client computers connected to a network, one or a plurality of image forming devices connected to either the network or the server, and devices of which one or a plurality can be connected to the server and which can be recognized by the server, said system comprising:
input means for inputting to said the server a job to be printed by an image forming device;
rendering means for rendering the job inputted by said input means into an image;
output means for outputting an image rendered by said rendering means to an image forming device specified by the job;
setting means for setting the specified image forming device as an output destination at the server;
output destination information holding means for holding a number of image forming devices set as output destinations by said setting means; and
recognizing means for recognizing a presence of devices connected to the server and a number thereof connected,
wherein the server periodically recognizes the number of devices connected to the server using said recognizing means, and determines a number n of recognized devices with a number m of image forming devices set as output destinations held in said output destination information holding means, and, in an event that n is judged to be less than m, a number of image forming devices for distributing and outputting jobs is restricted to at most the number n of recognized devices by recognizing means, or no jobs are output.

3. An image processing device for outputting image data to a plurality of image forming devices, said image processing device comprising:
input means for inputting an image forming job, wherein one of the plurality of image forming devices is specified as an output destination;
image processing means for generating image data for the specified image forming device based on the image forming job;
image output means for outputting image data generated by said image processing means to the specified image forming device;
connecting means for connecting to one or a plurality of devices; and
control means for restricting a number of image forming devices capable of receiving image data outputted from said image output means, of the plurality of image forming devices, based on a number of devices connected to said connecting means,
wherein, in an event that the number of devices connected to said connecting means is less than a number of the plurality of image forming devices, said control means selects a number of image forming devices corresponding to a difference in these numbers, and forbids image data outputted from said image output means from transmitting to the selected image forming devices.

4. An image processing device according to claim 3, wherein in an event that sending image data from said image output means to an image forming device is forbidden, said control means notifies an originator of the image forming job to that effect.

5. An image processing device according to claim 3, wherein the image forming job includes PDL data inputted from computer devices via networks.

6. An image processing device according to claim 3, wherein the image forming job includes image data read by scanners.

7. An image processing device according to claim 3, further comprising obtaining means for obtaining data indicating a type of image forming device set for each device connected to said connecting means, wherein said control means counts a number of devices per type of image forming device, and restricts by type of image forming device a number of image forming devices capable of producing an output for said image output means.

8. An image processing device according to claim 7, wherein, in an event that the specified image forming device is a predetermined type, said control means does not restrict the number of image forming devices capable of producing an output for said image output means.

9. An image processing method for outputting image data to a plurality of image forming devices, said method comprising:
an input step of inputting an image forming job, wherein one of the plurality of image forming devices is specified as an output destination;
an image processing step of generating image data corresponding to the specified image forming device based on the image forming job;
an image output step of outputting image data generated in said image processing step to the specified image forming device;
an identifying step of identifying one or a plurality of devices connected to a predetermined interface; and
a control step of restricting a number of image forming devices capable of outputting in said image output step, of the plurality of image forming devices, based on a number of devices connected,
wherein, in an event that the number of devices connected is less than a number of said plurality of image forming devices, said control step selects a number of image forming devices corresponding to a difference in those numbers from the plurality of image forming devices, and forbids image data outputted in said image output step from transmitting to the selected image forming devices.

10. An image processing method according to claim 9, wherein in an event that sending image data outputted in said image output step to the specified image forming device is forbidden, said control step notifies an originator of the image forming job to that effect.

11. An image processing method according to claim 9, wherein the image forming job includes PDL data inputted from computer devices via networks.

12. An image processing method according to claim 9, wherein the image forming job includes image data read by scanners.

13. An image processing method according to claim 9, further comprising an obtaining step for obtaining data indicating a type of image forming device set for each connected device identified in said identifying step, wherein said control step counts a number of devices per type of image forming device, and restricts by type of image forming device a number of image forming devices capable of producing an output in said image output step.

14. An image processing method according to claim 13, wherein, in an event that the specified image forming device is a predetermined type, said control step does not restrict the number of image forming devices capable of producing an output in said image output step.

15. A computer program stored on a computer-readable medium and executed by a computer of an image processing device for implementing a method of outputting image data to a plurality of image forming devices, said computer program comprising:
   code of an input step of inputting an image forming job, wherein one of the plurality of image forming devices is specified as an output destination;
   code of an image processing step of generating image data corresponding to the specified image forming device based on the image forming job;
   code of an image output step of outputting image data generated in the image processing step to the specified image forming device;
   code of an identifying step of identifying one or a plurality of devices connected to a predetermined interface; and
   code of a control step for restricting a number of image forming devices capable of receiving image data outputted in said image output step, of the plurality of image forming devices, based on a number of devices connected,
   wherein, in an event that the number of devices connected is less than a number of said plurality of image forming devices, said control step selects a number of image forming devices corresponding to a difference in those numbers from the plurality of image forming devices, and forbids image data outputted in said image output step from transmitting to the selected image forming devices.

16. A server apparatus which communicates with image forming devices, said server comprising:
   setting means for setting a specified image forming device as an output destination at the server;
   output destination information holding means for holding a number of image forming devices set as output destinations by said setting means;
   recognizing means for recognizing a number of licenses in response to an obtaining instruction to add a new image forming device as an output destination; and
   determination means for determining a number "N" of image forming devices connected to the server using the number of licenses that have been recognized by said recognizing means, and a number "M" of image forming devices already set as output destinations by said holding means and said new image forming device, when the specified image forming device is set as an output destination by said setting means,
   wherein in an event that said determination means judges M to be less than N, setting of the specified image forming device as the output destination is permitted and the number of image forming devices set as output destinations held by said holding means is adjusted, and in an event that said determination means judges N and M to be equal, setting of the specified image forming device as the output destination is not permitted.

17. A server apparatus according to claim 16, wherein the number of licenses is determined by the number of licensing devices connected to the server apparatus.

18. A server apparatus which communicates with one or a plurality of image forming devices and devices, said server apparatus comprising:
   setting means for setting a specified image forming device as an output destination at the server;
   output destination information holding means for holding a number of image forming devices set as output destinations by said setting means; and
   recognizing means for recognizing a number of licenses, wherein the server periodically determines a number "N" of recognized devices connected to the server using said recognizing means, and compares the number of recognized devices with a number "M" of image devices set as output destinations held in said output destination information holding means, and, in an event that N is judged to be less than M, a number of image forming devices for distributing and outputting jobs is restricted to at most the number of recognized devices, or no jobs are output.

19. A server apparatus according to claim 18, wherein the number of licenses is determined by the number of licensing devices connected to the server apparatus.

20. A method of operating a server apparatus which communicates with image forming devices, said method comprising:
   a setting step of setting a specified image forming device as an output destination at the server;
   an output destination information holding step of holding a number of image forming devices set as output destinations by said setting means;
   a recognizing step of recognizing a number of licenses in response to an obtaining instruction to add a new image forming device as an output destination; and
   a determination step of determining a number "N" of image forming devices connected to the server using the number of licenses that have been recognized by said recognizing step, and a number "M" of image forming devices already set as output destinations by said holding step and said new image forming device, when the specified image forming device is set as an output destination by said setting step,
   wherein in an event that said determination step judges M to be less than N, setting of the specified image forming device as the output destination is permitted and the number of image forming devices set as output destinations held by said holding step is adjusted, and in an event that said determination means judges N and M to be equal, setting of the specified image forming device as the output destination is not permitted.

21. A computer-readable medium storing a computer program for operating a server apparatus which communicates with one or a plurality of image forming devices, said computer program comprising:
   code for a setting step of setting a specified image forming device as an output destination at the server;
   code for an output destination information holding step of holding a number of image forming devices set as output destinations by said setting means;
   code for a recognizing step of recognizing a number of licenses in response to an obtaining instruction to add a new image forming device as an output destination; and
   code for a determination step of determining a number "N" of image forming devices connected to the server using the number of licenses that have been recognized by said recognizing step, and a number "M" of image forming devices already set as output destinations by said holding step and said new image forming device, when the specified image forming device is set as an output destination by said setting step,
   wherein in an event that said determination step judges M to be less than N, setting of the specified image forming device as the output destination is permitted and the number of image forming devices set as output destinations held by said holding step is adjusted, and in an event that said determination means judges N and M to be equal, setting of the specified image forming device as the output destination is not permitted.

22. A method of operating a server apparatus which communicates with one or a plurality of image forming devices, said method comprising:

a setting step of setting a specified image forming device as an output destination at the server;

an output destination information holding step of holding a number of image forming devices set as output destinations by said setting means; and a recognizing step of recognizing a number of licenses, wherein the server periodically determines a number "N" of recognized devices connected to the server using said recognizing step, and compares the number of recognized devices with a number "M" of image devices set as output destinations held in said output destination information holding step, and, in an event that N is judged to be less than M, a number of image forming devices for distributing and outputting jobs is restricted to at most the number of recognized devices, or no jobs are output.

23. A computer-readable medium storing a computer program for operating a server apparatus which communicates with one or a plurality of image forming devices, said program comprising:

code for a setting step of setting a specified image forming device as an output destination at the server;

code for an output destination information holding step of holding a number of image forming devices set as output destinations by said setting means; and code for a recognizing step of recognizing a number of licenses, wherein the server periodically determines a number "N" of recognized devices connected to the server using said recognizing step, and compares the number of recognized devices with a number "M" of image devices set as output destinations held in said output destination information holding step, and, in an event that N is judged to be less than M, a number of image forming devices for distributing and outputting jobs is restricted to at most the number of recognized devices, or no jobs are output.

* * * * *

UNITED STATES PATENT AND TRADEMARK OFFICE
CERTIFICATE OF CORRECTION

PATENT NO. : 7,148,980 B2 Page 1 of 1
APPLICATION NO. : 09/855586
DATED : December 12, 2006
INVENTOR(S) : Tominaga It is certified that error appears in the above-identified patent and that said Letters Patent is hereby corrected as shown below:

COLUMN 1:
Line 14, "an" should read -- a --.

COLUMN 10:
Line 60, "iamge1" should read -- image1 --.

COLUMN 14:
Line 42, "the" (1st occurrence) should be deleted; and
Line 46, "a" should read -- an --.

COLUMN 15:
Line 26, "Destination" should read -- destination --.

Signed and Sealed this

Twentieth Day of November, 2007

JON W. DUDAS
*Director of the United States Patent and Trademark Office*